(12) United States Patent
Ueda et al.

(10) Patent No.: US 12,311,857 B2
(45) Date of Patent: May 27, 2025

(54) VEHICLE-MOUNTED ASSEMBLY

(71) Applicant: DENSO CORPORATION, Kariya (JP)

(72) Inventors: Keisuke Ueda, Kariya (JP); Taketo Harada, Kariya (JP)

(73) Assignee: DENSO CORPORATION, Kariya (JP)

( * ) Notice: Subject to any disclaimer, the term of this patent is extended or adjusted under 35 U.S.C. 154(b) by 402 days.

(21) Appl. No.: 18/049,829

(22) Filed: Oct. 26, 2022

(65) Prior Publication Data

US 2023/0070901 A1  Mar. 9, 2023

Related U.S. Application Data

(63) Continuation of application No. PCT/JP2021/011964, filed on Mar. 23, 2021.

(30) Foreign Application Priority Data

Apr. 28, 2020 (JP) .................................. 2020-079506

(51) Int. Cl.
    *B60R 19/48* (2006.01)
(52) U.S. Cl.
    CPC ................... *B60R 19/483* (2013.01)
(58) Field of Classification Search
    CPC ...... B60R 19/483; G01S 7/521; G01S 15/931
    See application file for complete search history.

(56) References Cited

U.S. PATENT DOCUMENTS

| 2019/0242985 A1* | 8/2019 | Ishii ......................... G01S 7/521 |
| 2019/0391263 A1 | 12/2019 | Ueda et al. |
| 2020/0057897 A1* | 2/2020 | Matsuura ................. G01S 15/08 |

FOREIGN PATENT DOCUMENTS

| EP | 0 881 624 A2 | 12/1998 |
| JP | 2002-286834 A | 10/2002 |
| JP | 2006199145 A | 8/2006 |
| JP | 2006-337028 A | 12/2006 |
| JP | 2008-026231 A | 2/2008 |
| JP | 2009-229142 A | 10/2009 |
| JP | 2009228714 A | 10/2009 |
| JP | 2010-025813 A | 2/2010 |
| JP | 2010-078519 A | 4/2010 |
| WO | WO 2018164153 A1 * | 9/2018 |

* cited by examiner

*Primary Examiner* — Lori Lyjak
(74) *Attorney, Agent, or Firm* — Maschoff Brennan

(57) ABSTRACT

A vehicle-mounted assembly is designed to have a vehicle-mounted device attached to a plate-like vehicle body member with a through hole. The vehicle-mounted device includes a cylindrical member fit in a through-hole and a fastener which secures the cylindrical member to the vehicle body member. The cylindrical member includes a cylindrical main body extending along a center axis line, protrusions protruding from the main body in a direction crossing the center axis line. The fastener is held between the protrusions and the vehicle body member. The through-hole is equipped with a vehicle body joint which engages a device joint made of recessed and raised portions of the cylindrical member. The vehicle body joint is arranged at a given location on an inner circumference of the through-hole around a center of the through-hole.

13 Claims, 25 Drawing Sheets

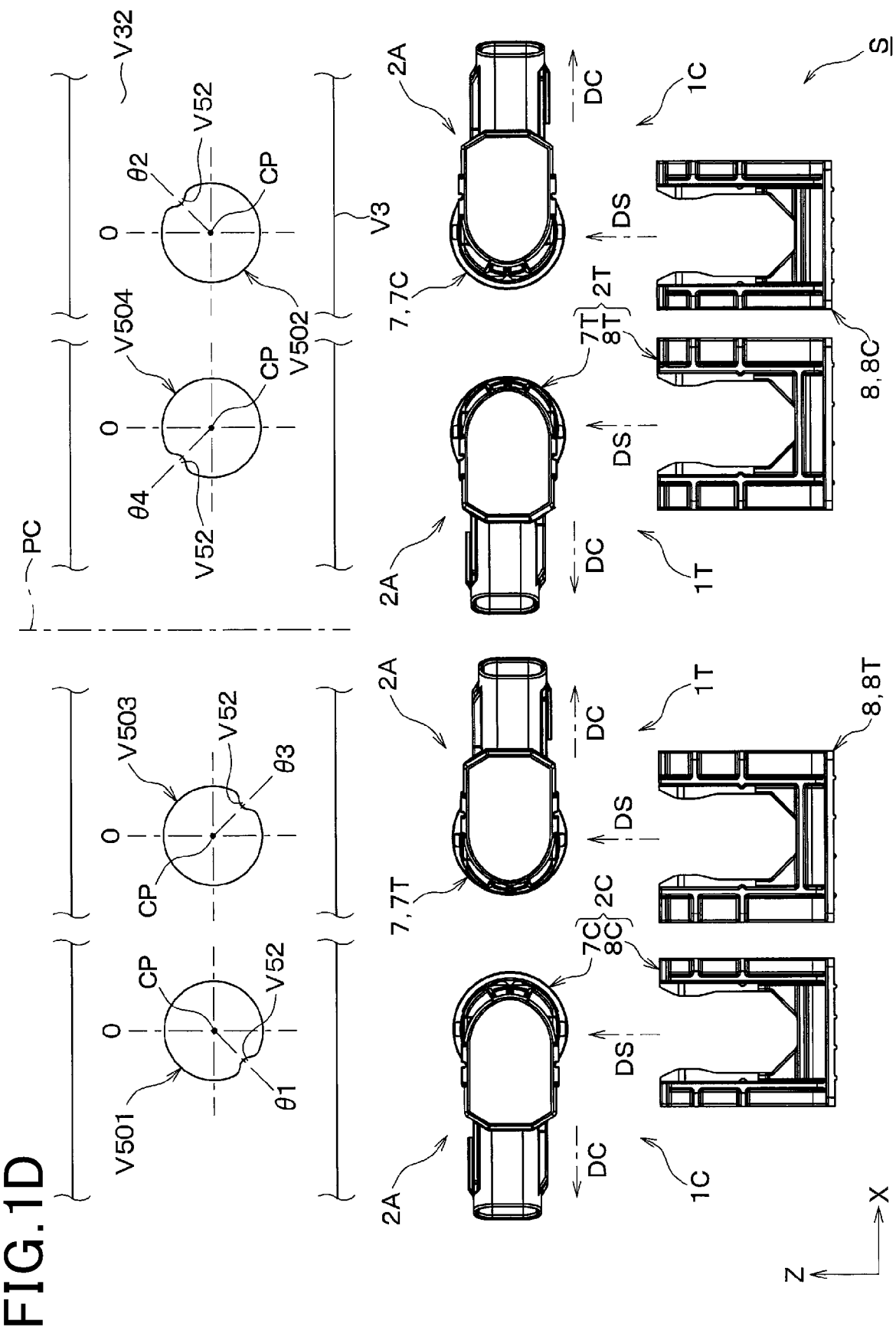

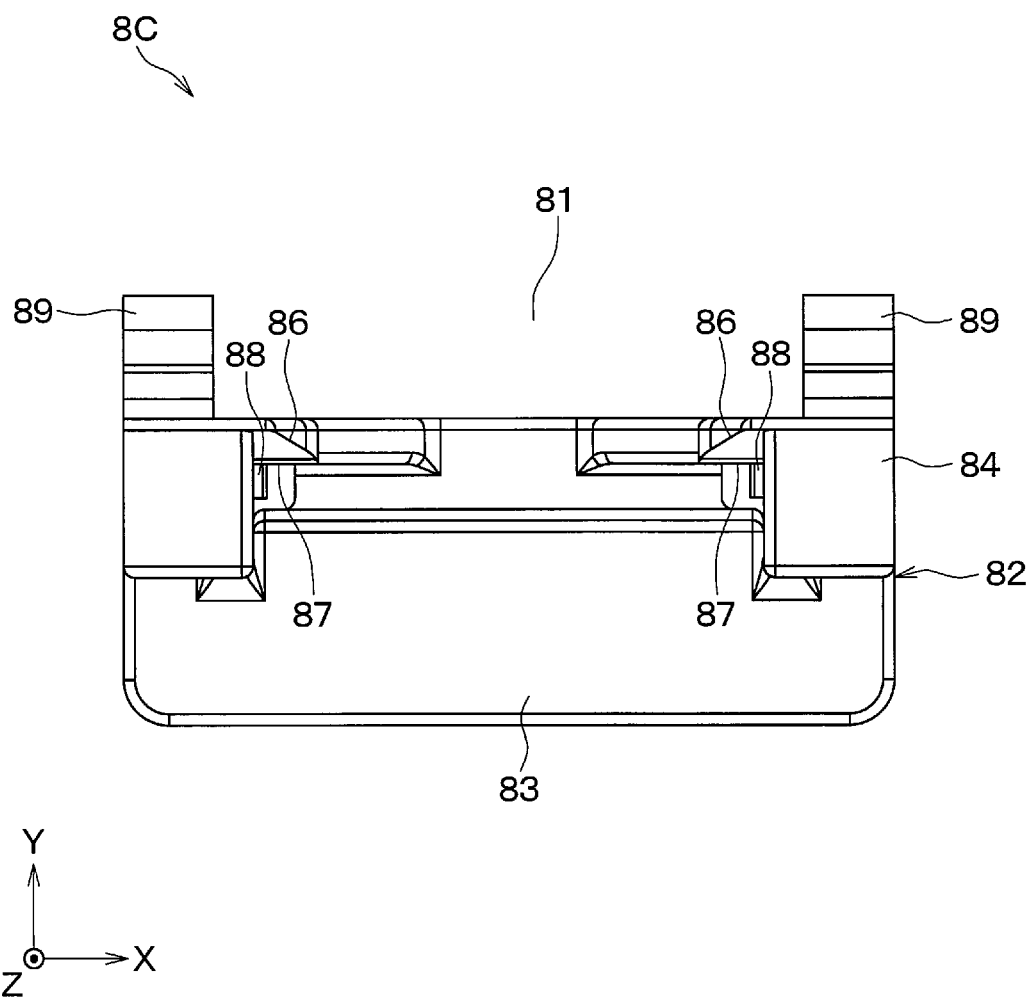

VEHICLE-MOUNTED ASSEMBLY

CROSS REFERENCE TO RELATED DOCUMENT

The present application claims the benefit of priority of Japanese Patent Application No. 2020-79506 filed on Apr. 28, 2020, the disclosure of which is incorporated in its entirety herein by reference.

TECHNICAL FIELD

This disclosure generally relates to a vehicle-mounted assembly of a vehicle-mounted device and a plate-like vehicle body member having a through-hole.

BACKGROUND ART

Obstacle sensing devices for vehicles are known which are mounted in a rear bumper of an automotive vehicle to detect obstacles behind the vehicle or around corners of the vehicle. The obstacle sensing devices each have an ultrasonic sensor which is mounted in the bumper and works to receive a return of ultrasound from the obstacle to detect the obstacle. In order to increase a horizontal sensing region without any risk of detection of a ground surface as an obstacle present outside the vehicle, the directivity of the ultrasonic sensor may be narrowed in the vertical direction and also widened in the horizontal direction.

Patent literature 1 teaches an ultrasonic sensor configured to be mounted in the bumper. The bumper has an elongated mounting hole formed therein. The ultrasonic sensor is equipped with a case which has smooth flat side surfaces for achieving a fit in the mounting hole. Such a structure enables the ultrasonic sensor to be inserted into the mounting hole in the bumper without any risk of incorrect orientation of the ultrasonic sensor in the vertical and lateral directions, thereby enabling the directivity of the ultrasonic sensor to be widened in the horizontal direction, but narrowed in the vertical direction to detect obstacles.

PRIOR ART DOCUMENT

Patent Literature

Patent Literature 1
Japanese Patent First Publication No. 1998-332817

SUMMARY OF THE INVENTION

The mounting of a vehicle-mounted device, such as an ultrasonic sensor, in a vehicle body member, such as a bumper, may result in errors in such mounting, which will also be referred to below as mounting errors. The mounting errors, as discussed in Patent literature 1, include errors in attaching the vehicle-mounted device to the vehicle body member in an incorrect orientation or attachment of an incorrect device to the vehicle body member.

This disclosure was made in order to minimize the above-described mounting errors. It is an object of this disclosure to provide a vehicle-mounted assembly which is designed to minimize risks of errors in attaching a vehicle-mounted device to a vehicle body member that is an attachment object.

According to one aspect of this disclosure, there is provided a vehicle-mounted assembly in which a vehicle-mounted device is attached to a plate-like vehicle body member with a through hole. The vehicle-mounted device includes a cylindrical main body extending along a center axis line, protrusions which protrude from the main body in a direction crossing the center axis line, a cylindrical member disposed in the through-hole, and a fastener which is held between the protrusions and the vehicle body member to secure the cylindrical member to the vehicle body member. The through-hole is equipped with a vehicle body joint which engages a device joint made of recessed and raised portions of the cylindrical member. The vehicle body joint is arranged at a given location on an inner circumference of the through-hole around the center of the through-hole.

Reference marks or numbers in parentheses are attached to elements described in this application. Such reference marks or numbers merely represent an example of a correspondence relation between the elements and parts in the following embodiments. This disclosure is, therefore, not limited by the reference marks or numbers used in the embodiments.

BRIEF DESCRIPTION OF THE DRAWINGS

FIG. 1D is an exploded back view which illustrates the vehicle-mounted assembly in FIG. 1C.

FIG. 11C is a plan view of the corner retainer in FIG. 11A.

MODES FOR CARRYING OUT THE INVENTION

Embodiments

Embodiments in this disclosure will be described below with reference to the drawings. Possible modifications of each embodiment will be all discussed following explanation of the embodiments in order not to disturb understanding of each embodiment.

Vehicle Mounted Assembly

Figure 1A:
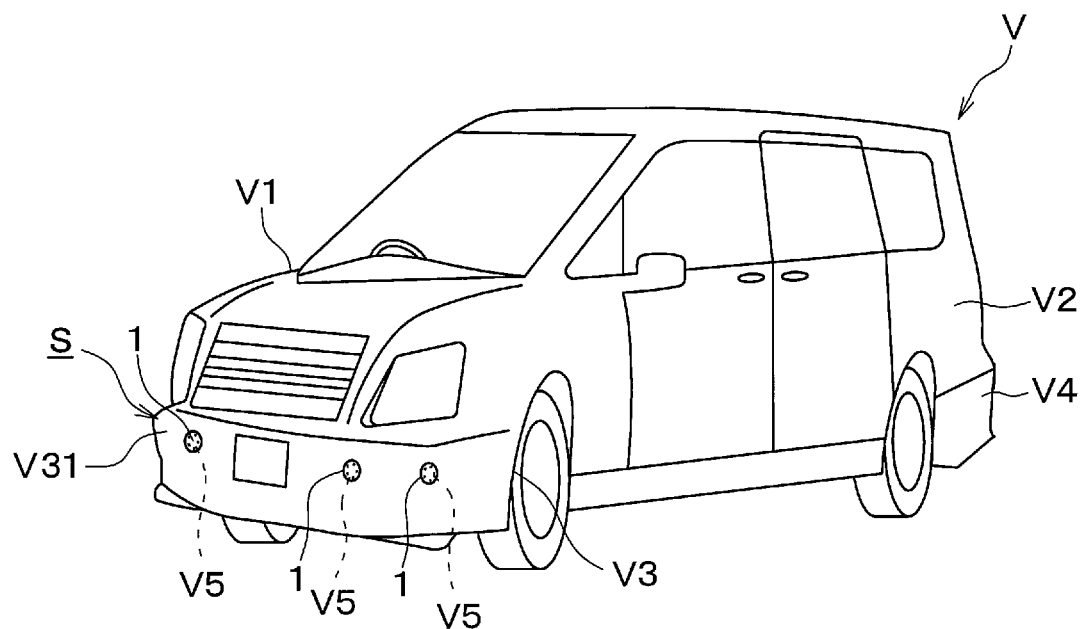
FIG. 1A is a perspective view which illustrates an outer appearance of a vehicle in which ultrasonic sensors are installed according to embodiments.

Referring to FIG. 1a, the ultrasonic sensors 1 (i.e., vehicle-mounted device) in this embodiment are configured as vehicle-mounted clearance sonars attached to the vehicle V. Each of the ultrasonic sensors 1 mounted in the vehicle V works to detect obstacle(s) around the vehicle V.

Specifically, each of the ultrasonic sensors 1 is configured as a transceiver which is a combination of an ultrasound transmitter and a receiver. More specifically, each of the ultrasonic sensors 1 is designed to emit ultrasound in the form of a detecting wave into an external space outside the vehicle V, receive radio waves including a reflected wave arising from reflection of the ultrasound on an obstacle, and output a signal as a function of the received radio waves.

Each of the ultrasonic sensors 1 in this embodiment is designed to have directivities which are different between the horizontal and vertical directions. Specifically, the ultrasonic sensors 1 work to emit a detecting wave at a wider directivity angle in the horizontal direction and a narrower directivity angle in the vertical direction. The directivity angle, as referred to herein, is an angle which a generatrix of an oval conical lobe makes with a directivity axis (i.e., an axis of maximum radiation intensity) where the oval conical lobe is defined to be centered around the directivity axis and represents a range of the center of sound pressure on the directivity axis to −6 dB. The directivity angle is also called a half-power angle. The directivity axis, as referred to herein, is defined by a straight line extending from the ultrasonic sensor 1 in a direction where a detecting wave emitted from the ultrasonic sensor 1 has a maximum sound pressure. The directivity axis is also called the center axis of the directivity or detecting axis.

The vehicle V is a four-wheeled automotive vehicle and equipped with the box-shaped vehicle body V1, the body panel V2 that is a plate-like body member, i.e., an exterior body panel, the front bumper V3, and the rear bumper V4. The front bumper V3 is attached to a front end of the vehicle body V1. The rear bumper V4 is attached to a rear end of the vehicle body V1. The front bumper V3 and the rear bumper V4 are made of metallic plates.

Some of the ultrasonic sensors 1 are configured to be secured to the front bumper V3 to detect an object existing in front of or on a front lateral side of the vehicle V. The other ultrasonic sensors 1 are also configured to be secured to the rear bumper V4 to detect an object existing in the back of or a rear lateral side of the vehicle V.

In the following discussion, the state where each of the ultrasonic sensors 1 is attached to the front bumper V3 or the rear bumper V4 which are not yet secured to the vehicle body V1 will be referred to as an on-bumper state or a bumper-mounted state. The state where each of the ultrasonic sensors 1 is attached to the front bumper V3 or the rear bumper V4 already secured to the vehicle body V1 will be referred to as an on-vehicle state or a vehicle-mounted state. The vehicle-mounted state is, however, sometimes used to include the bumper-mounted state. The vehicle-mounted assembly S in this embodiment includes the front bumper V3 or the rear bumper V4 that is also referred to as a vehicle body member and the ultrasonic sensor(s) 1 attached to the front bumper V3 or the rear bumper V4.

Specifically, in the vehicle-mounted state, a plurality of (e.g., four) ultrasonic sensors 1 are mounted in the front bumper V3. The ultrasonic sensors 1 in the front bumper V3 are located away from each other in the width direction of the vehicle V. Similarly, a plurality of (e.g., four) ultrasonic sensors 1 are mounted in the rear bumper V4. Each of the front bumper V3 and the rear bumper V4 has formed therein the mounting holes V5 in which the ultrasonic sensors 1 are installed.

For the brevity of disclosure, the following discussion will refer to the vehicle-mounted assembly S including one of the ultrasonic sensors 1 secured to the front bumper V3. The vehicle-mounted assembly S for the rear bumper V4 has the same structure as that for the front bumper V3.

The front bumper V3 has formed therein the mounting holes V5 each of which extends through a thickness of the front bumper V4 to open at the outer bumper surface V31 into an exterior space outside the vehicle V. The bumper surface V31 is an outer surface of the front bumper V3 and exposed to the exterior space in the vehicle-mounted state.

Figure 1B:
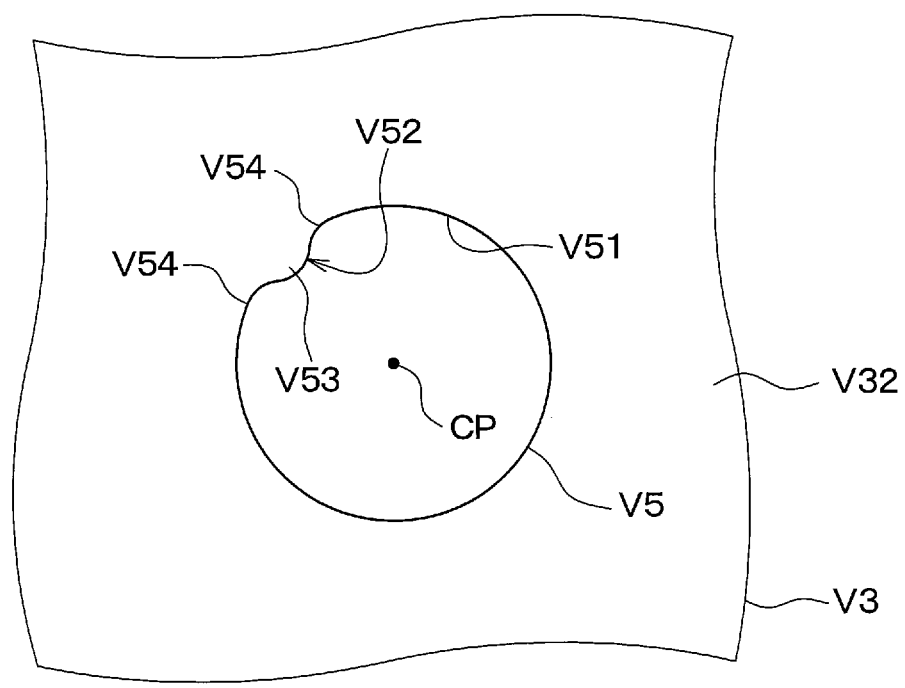
FIG. 1B is an enlarged back view which illustrates a region around a mounting hole formed in a front bumper shown in FIG. 1A.

FIG. 1B is an enlarged illustration of each of the mounting holes V5, as viewed from outside the inner bumper surface V32 opposed to the outer bumper surface V31. Each of the mounting holes V5 is in the form of a circular hole defining a circular cylindrical space in the front bumper V3. Each of the mounting holes V5, therefore, has a cylindrical inner surface V51.

In order to eliminate a risk of the mounting error of each of the ultrasonic sensors 1, each of the mounting holes V5, as illustrated in FIG. 1B, has formed thereon the bumper joint V52 which will also be referred to as a vehicle body joint. The mounting error, as referred to herein, includes an accident in which the wrong ultrasonic sensors are about to be or have been attached to the mounting holes V5 of the vehicle V. In this embodiment, each of the mounting holes V5 has a respective one of the bumper joints V52.

The bumper joint V52 is arranged at a given location on the circumference of the mounting hole V5 around the center CP. The center CP is the center of an arc defined by an edge of the mounting hole V5 excluding the bumper joint V52. In other words, the center CP of the mounting hole V5 is the center of a circle defined by a line of intersection between the edge of the cylindrical inner surface V51 of the mounting hole V5 excluding the bumper joint V51 and the outer bumper surface V31 or the inner bumper surface V32. The circumferential direction of the mounting hole V5, as referred to herein, is a circumferential direction of a true circle defined by a perimeter of the circular mounting hole V5 excluding the bumper joint V52. A location on the circumference of the mounting hole V5 will also be referred to as a circumferential location or position. The given location of the bumper joint V52 on the circumference of the mounting hole V5 will be described later in detail.

The mounting error, as referred to herein, also includes an accident such that each of the correct ultrasonic sensors 1 having a correct part number has been installed or is about to be mounted in a corresponding one of the mounting holes V5 in an incorrect orientation. The mounted orientation of the ultrasonic sensors 1 represents an attitude (including an angular orientation or angular position) thereof relative to the front bumper V3 in the bumper-mounted state where the ultrasonic sensors 1 have been attached to the front bumper V3. The angular orientation of the ultrasonic sensors 1 will also be referred to as a mounted angle or a sensor mounting angle and represents an angular orientation or position thereof around the directivity axis of the ultrasonic sensors 1 in the bumper-mounted state. The mounted orientation of the ultrasonic sensors 1 in the vehicle-mounted state will also be referred to as a vehicle-mounted orientation. Similarly, the mounted angle of the ultrasonic sensors 1 in the vehicle-mounted state will also be referred to as a vehicle-mounted angle around the directivity axis of the ultrasonic sensor 1. The bumper joint V52 is designed to establish engagement with a device joint (which will be described later in detail) to achieve or fix a desired value of the vehicle-mounted angle of each of the ultrasonic sensors 1.

The bumper joint V52 is defined by raised and recessed portions of the circular mounting hole V5 in a concave-convex shape which result in a change in inner diameter of the mounting hole V5. The inner diameter of the mounting hole V5 is expressed as a distance between the center CP thereof and the inner surface V51. Specifically, each of the mounting holes V5 is configured to have the bumper joint V52 formed in or on the inner surface V51 in a concave-convex shape.

The bumper joint V52 in this embodiment, as illustrated in FIG. 1B, includes the bumper protrusion V53 and a pair of bumper recesses V54. The bumper protrusion V53 is defined by a portion of the inner surface V51 protruding inwardly in the mounting hole V5. The bumper protrusion V53 has a round tip. Specifically, the bumper protrusion V53 projects from the inner surface V51 of the mounting hole V5 toward the center CP. The bumper recesses V54 are defined by recessed portions of the inner surface V51 which are located on opposite sides of the bumper protrusion V53 in the circumferential direction and result from the formation of the bumper protrusion V53. The bumper recesses V54 are shaped to be round in a planar view of the mounting hole V5. In other words, each of the mounting holes V5 is shaped to have a decreased inner diameter on the bumper protrusion V53 of the inner surface V51 and a constant inner diameter on another portion of the inner surface V51.

Figure 1C:
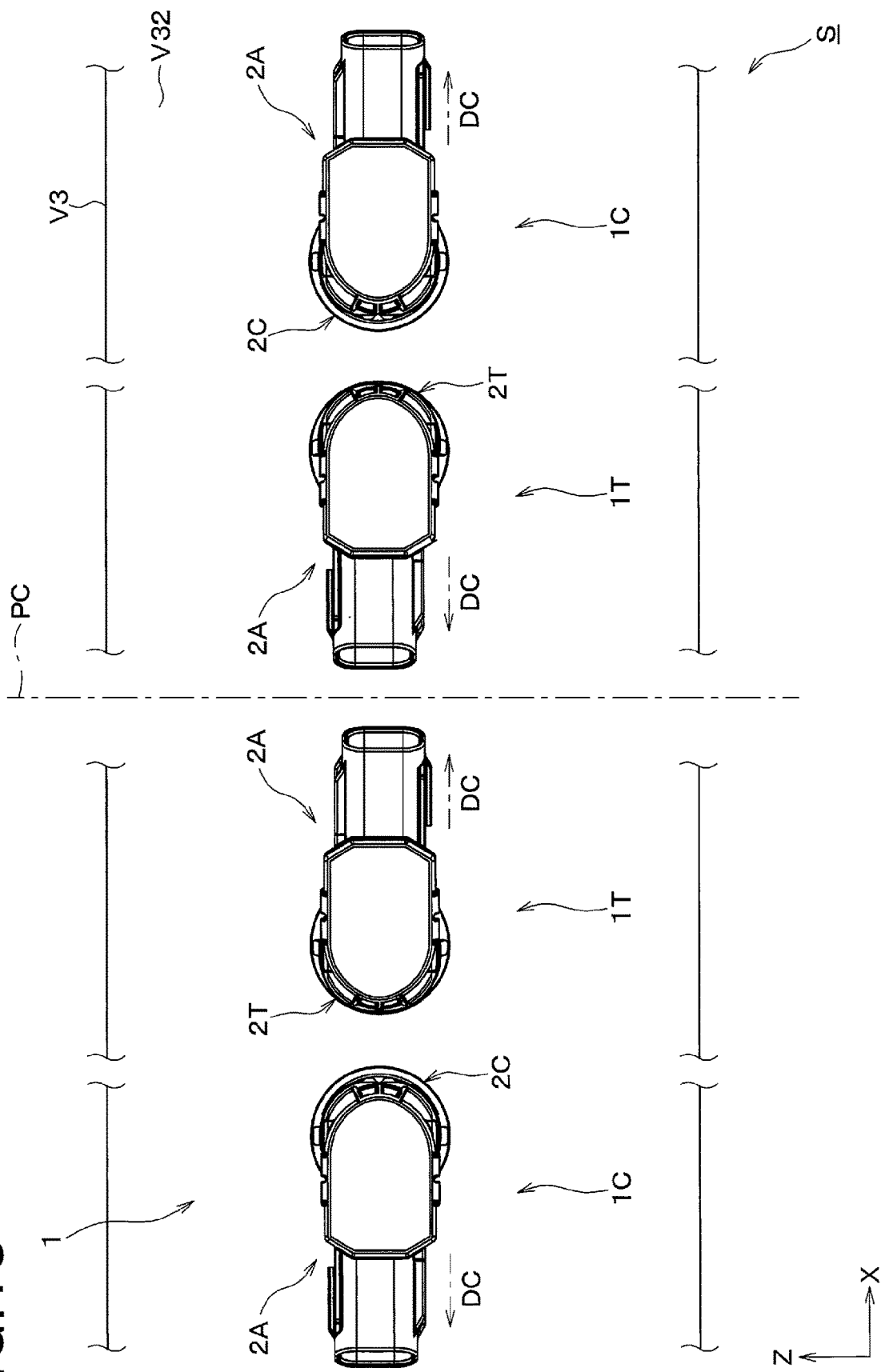
FIG. 1C is a back view which schematically illustrates a structure of a vehicle-mounted assembly shown in FIG. 1A.

FIGS. 1C and 1D schematically illustrate the vehicle-mounted assembly S as viewed from the inner bumper surface V32. The structure of the vehicle-mounted assembly S will be described below with reference to FIGS. 1C and 1D. For the sake of convenience of explanation, the following discussion uses a Cartesian coordinate (X, Y, Z) system which is defined based on a direction of the force of gravity in the vehicle-mounted state. This disclosure is, however, not limited to the following examples referring the Cartesian coordinates.

In FIGS. 1C and 1D, an upward vertical direction is defined as a positive Z-axis direction. The vertical direction, as referred to herein, is a direction opposite to a direction of the force of gravity when the vehicle V is placed in a drivable condition on a horizontal plane. The upward direction, as referred to herein, coincides with an upward vertical direction or a direction oriented at a small acute angle α (e.g., 10° or less) to the upward vertical direction. The positive Z-axis direction, therefore, becomes identical with the upward vertical direction or a direction traversing the upward vertical direction depending upon the configuration of the front bumper V. Similarly, the Y-axis direction becomes identical with the horizontal direction or a direction traversing the horizontal direction. In the following discussion, a view of a specified portion of the vehicle V in a drivable condition on the horizontal plane from above it in the downward vertical direction will be referred to as a planar view.

FIGS. 1C and 1D omits a portion of the front bumper V3 which excludes where the ultrasonic sensors 1 are arranged. The front bumper V3 extends in the width direction of the vehicle V. For the brevity of illustration, FIGS. 1C and 1D show the directivity axes of the ultrasonic sensors 1 as extending perpendicular to the drawing on a portion of the front bumper V3 to which the ultrasonic sensors 1 are attached. In the drawings, the X-axis direction is identical with a horizontal direction along the width of the vehicle V. The width direction of the vehicle V is identical with a direction perpendicular to a longitudinal direction of the vehicle V and a height-wise direction of the vehicle V. The height-wise direction of the vehicle V is identical with a direction parallel to the direction of the force of gravity in a drivable condition of the vehicle V on the horizontal plane. The longitudinal direction of the vehicle V extends along the length of the vehicle V. Specifically, the longitudinal direction of the vehicle V is parallel to a direction in which the front bumper V3 and the rear bumper V4 face each other in the planar view. The X-axis direction in the drawing may not be parallel to the width direction of the vehicle V in the vehicle-mounted state.

The vehicle-mounted assembly S in this embodiment includes corner sensors 1C and/or center sensors 1T (i.e., the ultrasonic sensors 1) mounted in the front bumper V4 that is the vehicle body member. Specifically, the front bumper V3, as clearly illustrated in FIG. 1D, has the first mounting hole V501, the second mounting hole V502, the third mounting hole V503, and the fourth mounting hole V504 formed therein. The first mounting hole V501 and the second mounting hole V502 are shaped to have the corner sensors 1C mounted therein. The third mounting hole V503 and the fourth mounting hole V504 are shaped to have the center sensors 1T mounted therein. In the following discussion, each of the first mounting hole V501, the second mounting hole V502, the third mounting hole V503, and the fourth mounting hole V504 will generally be referred to as the mounting hole V5.

The first mounting hole V501 and the second mounting hole V502 are arranged symmetrically with respect to the vehicle center plane PC. The vehicle center plane PC, as referred to herein, is an imaginary plane which passes through the center of the width of the vehicle V and is defined to extend perpendicular to the width direction of the vehicle V. In other words, the vehicle center plane PC extends parallel to the longitudinal direction and the heightwise direction of the vehicle V. Similarly, the third mounting hole V503 and the fourth mounting hole V504 are arranged symmetrically with respect to the vehicle center plane PC. The third mounting hole V503 and the fourth mounting hole V504 are located between the first mounting hole V501 and the second mounting hole V502. Specifically, the first mounting hole V501, the third mounting hole V503, the fourth mounting hole V504, and the second mounting hole V502 are arranged in this order in the width direction of the vehicle V.

The first mounting hole V501, the second mounting hole V502, the third mounting hole V503, and the fourth mounting hole V504 are identical in shape with each other. Specifically, the first mounting hole V501, the second mounting hole V502, the third mounting hole V503, and the fourth mounting hole V504 are circular and have diameters identical with each other. The first mounting hole V501, the second mounting hole V502, the third mounting hole V503, and the fourth mounting hole V504 are equipped with the bumper joints V52, i.e., the bumper protrusions V53, identical in configuration with each other. However, the bumper joints V52 of the first mounting hole V501, the second mounting hole V502, the third mounting hole V503, and the fourth mounting hole V504 are arranged at circumferential locations different from each other.

FIG. 1D expresses the circumferential locations of the bumper joints V52 by angles of direction based on a reference angle of direction from the center CP in the positive Z-axis direction. The reference angle of direction is defined as zero. The angle of direction of each of the bumper joints V52 is expressed by an angle of direction of a line defined to extend from the center CP through the circumferential center of the bumper joint V52. The angle of direction of the line is expressed as increasing in the clockwise direction in the drawings.

The first mounting hole V501 which will also be referred to as a first through-hole has the bumper joint V52 located at a first angular position $\theta 1$ in the circumferential direction thereof. The second mounting hole V502 which will also be referred to as a second through-hole has the bumper joint V52 located at a second angular position $\theta 2$ in the circumferential direction thereof. The third mounting hole V503 which will also be referred to as a third through-hole has the bumper joint V52 located at a third angular position $\theta 3$ in the circumferential direction thereof. The fourth mounting hole V504 which will also be referred to as a fourth through-hole has the bumper joint V52 located at a fourth angular position $\theta 4$ in the circumferential direction thereof.

Specifically, the first angular position $\theta 1$ is selected to be 225°. The second angular position $\theta 2$ is selected to be 45°. In other words, the first angular position $\theta 1$ and the second angular position $\theta 2$ are symmetrically or diametrically opposed to each other across the center CP, so that they are located at 180° away from each other. The third angular position $\theta 3$ is selected to be 135°. The fourth angular position $\theta 4$ is selected to be 315°. In other words, the third angular position $\theta 3$ and the fourth angular position $\theta 4$ are symmetrically or diametrically opposed to each other across the center CP, so that they are located at 180° away from each other.

The corner sensors 1C which will also be referred to below as first vehicle-mounted devices are fit in the first mounting hole V501 and the second mounting hole V502, so that they are located close to ends of the front bumper V3 which are opposed to each other in the width direction of the vehicle V. The corner sensor 1C fit in the first mounting hole V501 is arranged in a first orientation (which will also be referred to as a first mounted orientation). The first orientation is an orientation of the corner sensor 1C in which a longitudinal connector direction DC (which will be described later in detail) faces in the negative X-axis direction in the drawings.

The corner sensor 1C fit in the second mounting hole V502 is arranged in a second orientation different from the first orientation. The second orientation is an orientation of the corner sensor 1C in which the longitudinal connector direction DC faces in the positive X-axis direction in the drawings. The second orientation is different in the vehicle-mounted angle from the first orientation by 180°.

The corner sensors 1C disposed in the first mounting hole V501 and the second mounting hole V502 are, as apparent from the above discussion, oriented to have the longitudinal connector directions DC which are opposite each other in the X-axis direction in the drawings. In other words, the two corner sensors 1C are retained in the front bumper V3 to have the longitudinal connector directions DC which face outwardly in the width direction of the vehicle V. The corner sensors 1C fit in the first mounting hole V501 and the second mounting hole V502 are oriented to be opposite each other across the vehicle center plane PC.

The center sensors 1T which will also be referred to as second vehicle-mounted devices are disposed in the third mounting hole V503 and the fourth mounting hole V504, so that they are located close to the center of the front bumper V3 in the width direction of the vehicle V. The center sensor 1T fit in the third mounting hole V503 is arranged in a third orientation. The center sensor 1T fit in the fourth mounting hole V504 is arranged in a fourth orientation different from the third orientation.

The third orientation is an orientation of the center sensor 1T in which the longitudinal connector direction DC faces in the positive X-axis direction in the drawings. In other words, the third orientation is identical in sensor-mounted orientation (i.e., the vehicle-mounted angle) with the second orientation. The fourth orientation is an orientation of the center sensor 1T in which the longitudinal connector direction DC faces in the negative X-axis direction in the drawings. The fourth orientation is different in sensor-mounted orientation (i.e., the vehicle-mounted angle) from the third orientation by 180°. The fourth orientation is identical in sensor-mounted orientation (i.e., the vehicle-mounted angle) with the first orientation.

The center sensors 1T disposed in the third mounting hole V503 and the fourth mounting hole V504 are, as apparent from the above discussion, oriented to have the longitudinal connector directions DC which are opposite each other in the X-axis direction in the drawings. In other words, the two center sensors 1T are retained in the front bumper V3 to have the longitudinal connector directions DC which face inwardly in the width direction of the vehicle V. The center sensors 1C fit in the third mounting hole V503 and the fourth mounting hole V504 are oriented to be opposite each other across the vehicle center plane PC.

Each of the corner sensors 1C includes the sensor body 2A and the first component assembly 2C. The sensor body 2A is configured to be attached using the first component assembly 2C to a corresponding one of the first mounting hole V501 and the second mounting hole V502 in the front bumper V3. Each of the center sensors 1T includes the sensor body 2A and the second component assembly 2T. The sensor body 2A is configured to be attached using the second component assembly 2T to a corresponding one of the third mounting hole V503 and the fourth mounting hole V504 in the front bumper V3. In the following discussion, the corner sensors 1C and the center sensors 1T will also be generally referred to as the ultrasonic sensors 1.

Figure 2A:
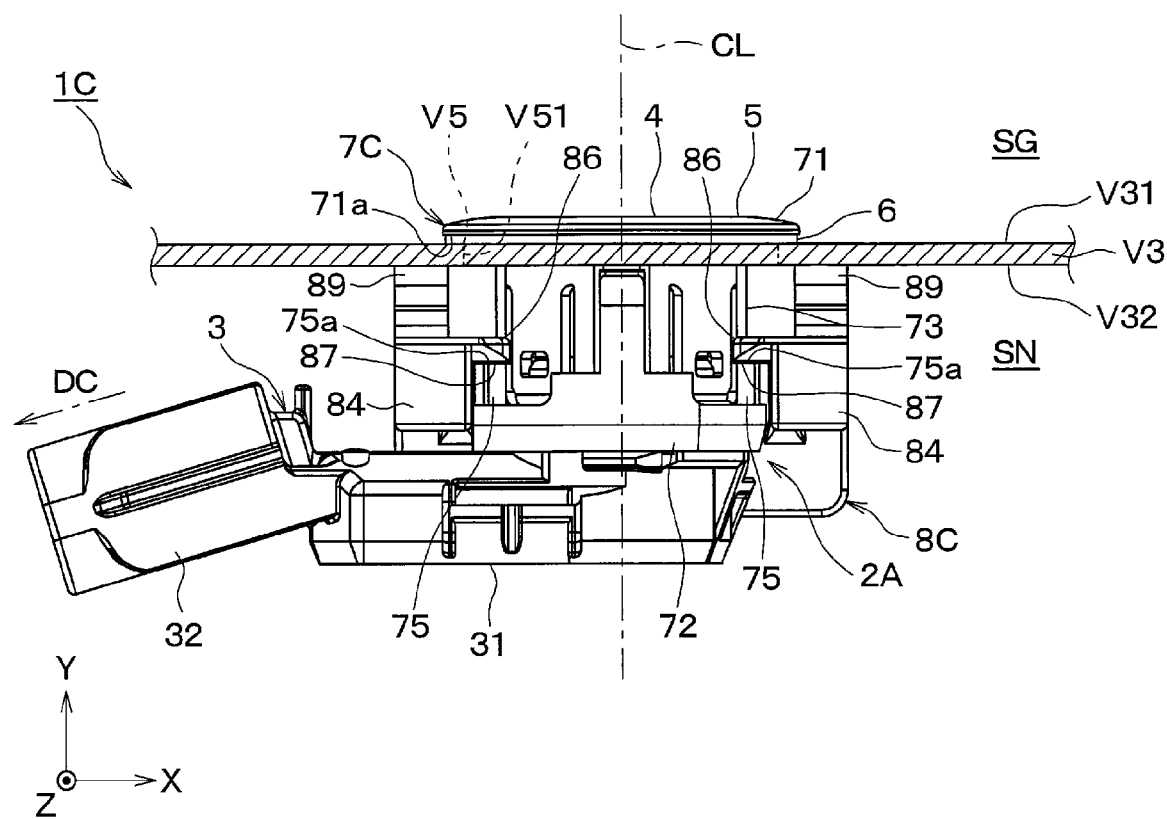
FIG. 2A is a plan view which illustrates a corner sensor shown in FIG. 1C.
Figure 2B:
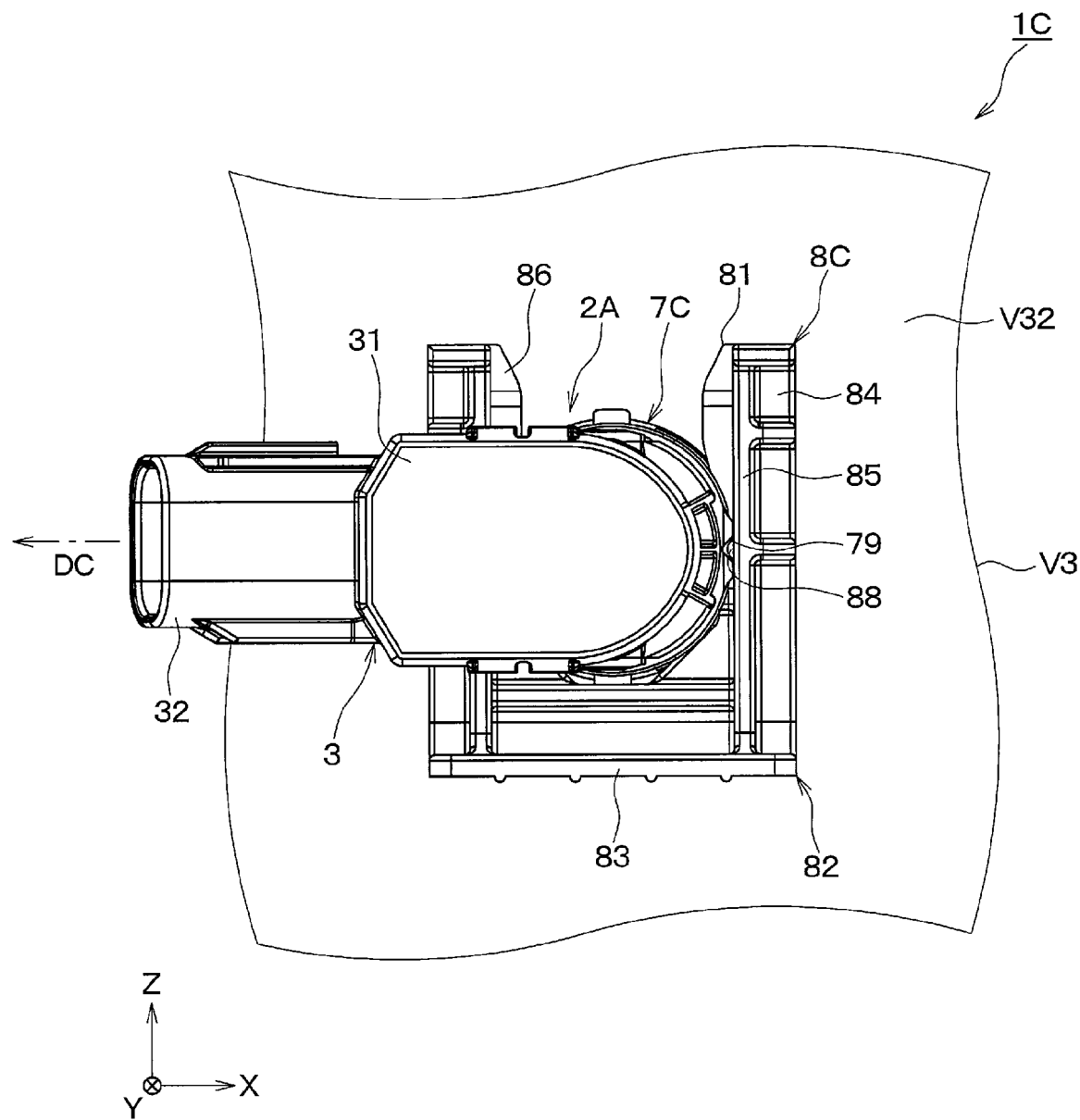
FIG. 2B is a back view of a corner sensor shown in FIG. 1C.
Figure 2C:
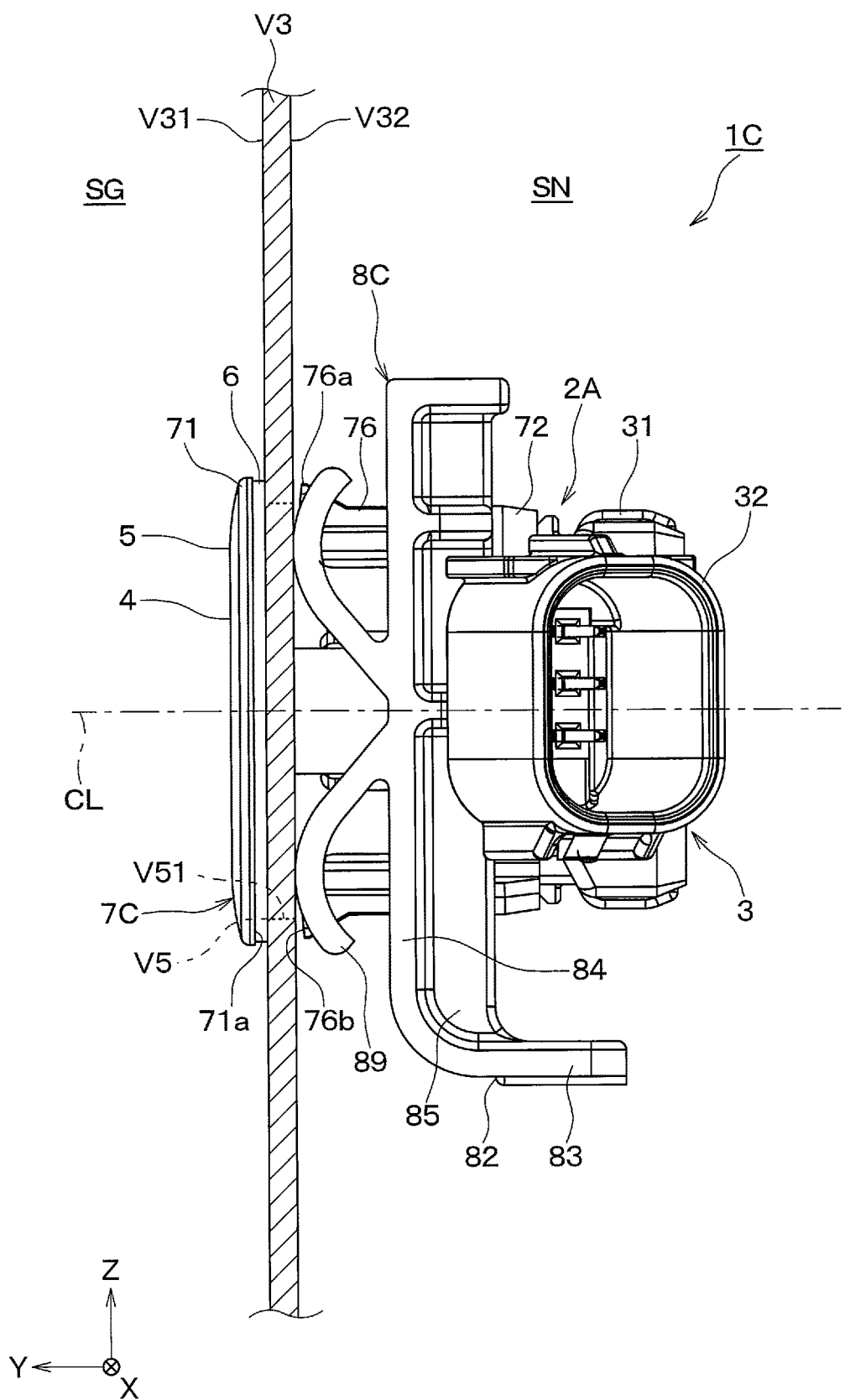
FIG. 2C is a right side view of a corner sensor shown in FIG. 1C.
Figure 2D:
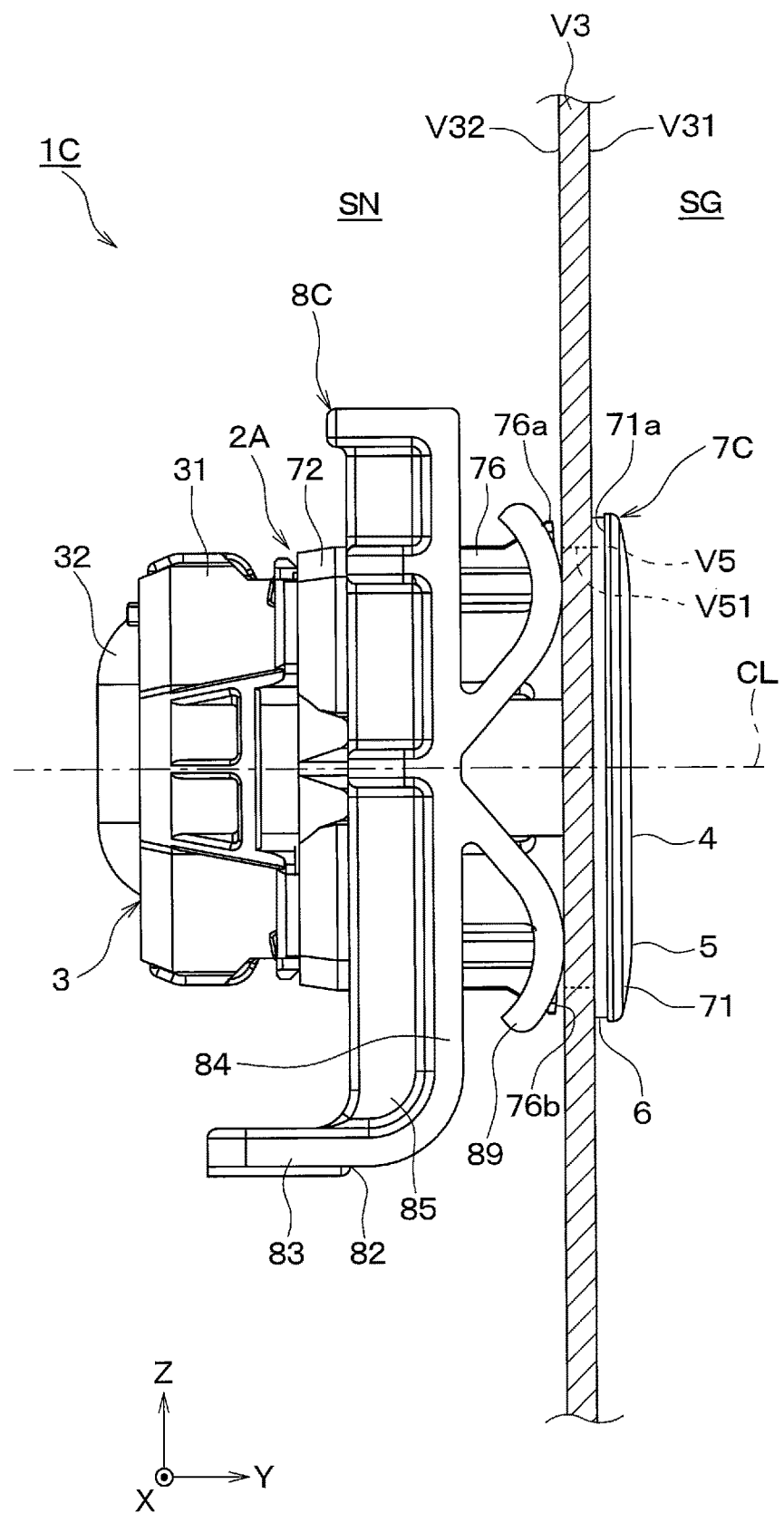
FIG. 2D is a left side view of a corner sensor shown in FIG. 1C.

Referring to FIGS. 1D and 2A, each of the corner sensors 1C is equipped with the sensor body 2. The sensor body 2 includes the sensor case 3, the ultrasonic microphone 4, the cushion 5, the anti-vibration spacer 6, the bezel 7, and the retainer 8. The bezel 7 and the retainer 8 constitute the first component assembly 2C. The bezel 7 and the retainer 8 of the first component assembly 2C will also be referred to as the corner bezel 7C and the corner retainer 8C, respectively.

The center sensors 1T are designed to have the same structure as that of the corner sensors 1C except for the second component assembly 2T instead of the first component assembly 2C. The bezel 7 and the retainer 8 of the second component assembly 2T will also be referred to as the center bezel 7T and the center retainer 8T, respectively. In the following discussion, the corner bezel 7C and the center bezel 7T will also be generally referred to as the bezels 7. The corner retainer 8C and the center retainer 8T will also be generally referred to as the retainers 8.

The corner sensors 1C and the center sensors 1T are, as clearly illustrated in FIG. 1D, oriented to have the same retainer attachment directions DS which face in the Z-axis direction in the drawing. The retainer attachment direction DS, as referred to herein, is a direction in which the retainer 8 is brought close to a secondary assembly of each of the ultrasonic sensors 1 which has been inserted into the mounting hole V5 when the ultrasonic sensor 1 is attached to the front bumper V3. The secondary assembly is an assembly of a primary assembly, the anti-vibration spacer 6, and the bezel 7 which are attached to the primary assembly. The primary assembly is the sensor body 2A that is an assembly of the sensor case 3, the ultrasonic microphone 4, and the cushion 5. The state of each of the ultrasonic sensors 1 in which the secondary assembly is completed will also be referred to as an assembled state. Each of the bumper-mounted state and the vehicle-mounted state is equivalent to the assembled state.

Figure 2E:
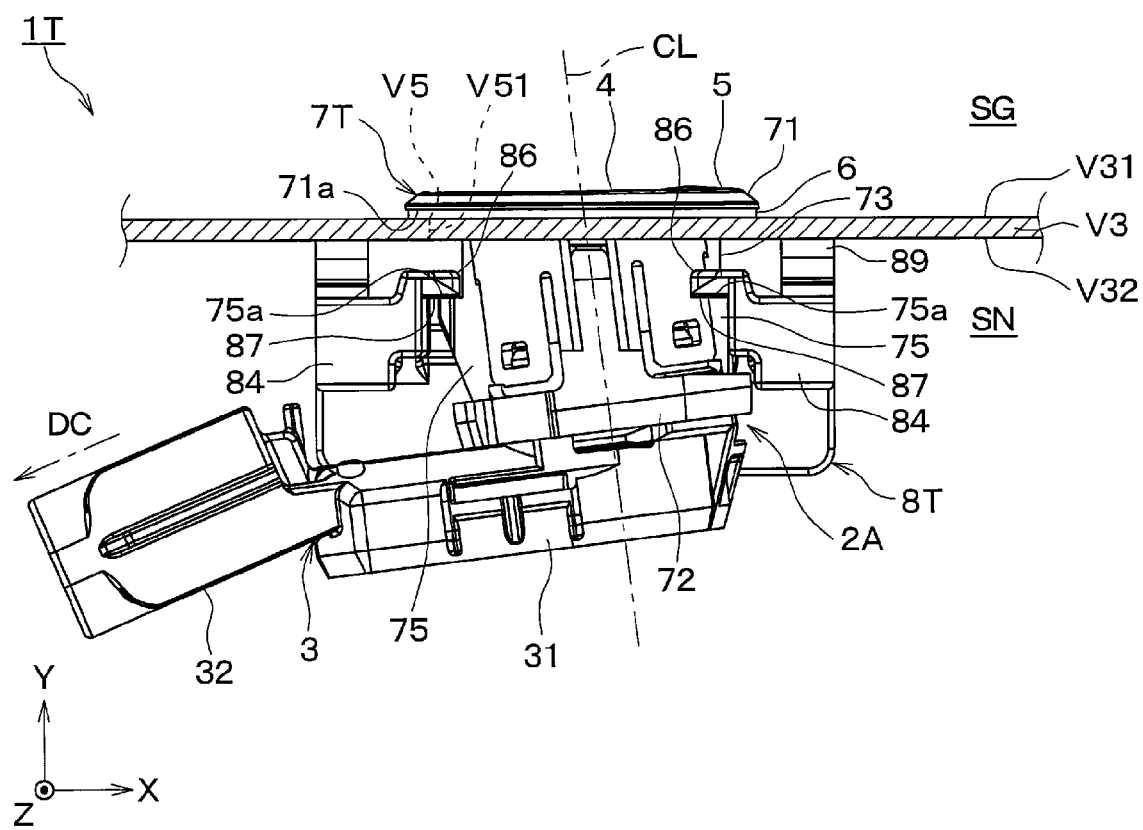
FIG. 2E is a plan view of a center sensor shown in FIG. 1C.

Ultrasonic Sensor FIGS. 2A to 2D illustrate one of the corner sensors 1C disposed in the first mounting hole V501 in the vehicle-mounted state. FIG. 2E illustrates one of the center sensors 1T disposed in the fourth mounting hole V504 in the vehicle-mounted state. The structures of the corner sensor 1C and the center sensor 1T will be described below in detail.

For the sake of convenience of explanation, a right-handed Cartesian coordinate (X, Y, Z) system is, as illustrated in FIG. 2A and the following figures, defined based on a direction of the force of gravity in the vehicle-mounted state. In the illustrated right-handed coordinate system, the positive Z-axis direction in the right-handed Cartesian coordinate (X, Y, Z) system in FIG. 2A and the following figures coincides with the positive Z-axis direction shown in FIGS. 1C and 1D.

The positive Y-axis direction in the right-handed Cartesian coordinate (X, Y, Z) system is parallel to a thickness-wise direction of the front bumper V3 at a sensor attachment location and extends from inside the bumper-inside space SN to outside the bumper-outside space SG. The sensor attachment location is a location where each of the ultrasonic sensors 1 is secured to the front bumper V3 which coincides with the center CP of each of the mounting holes V5 in this embodiment. The bumper-outside space SG is space which exists outside the vehicle V in the vehicle-mounted state and to which the outer bumper surface V31 is exposed. The bumper-inside space SN is space which exists inside the vehicle V in the vehicle-mounted state and to which the inner bumper surface V32 is exposed.

The X-axis direction in the right-handed Cartesian coordinate (X, Y, Z) system is perpendicular to the thickness-wise direction of the front bumper V3 at the sensor attachment location and coincides with a horizontal direction in the vehicle-mounted state. The positive X-axis direction in the right-handed Cartesian coordinate (X, Y, Z) system coincides with the positive X-axis direction in FIGS. 1C and 1D or a direction oriented at a small acute angle to the positive X-axis direction in FIGS. 1C and 1D. Accordingly, the X-axis direction in the right-handed Cartesian coordinate (X, Y, Z) system, like the X-axis direction in FIGS. 1C and 1D, coincides with a horizontal direction along the width direction of the vehicle V.

In the following discussion, a direction parallel to the center axis line CL coinciding with the directivity axis of each of the ultrasonic sensors 1 will also be referred to as an axial direction. One of opposed ends of an axially extending component or part of each of the ultrasonic sensors 1 which faces in the positive Y-axis direction will also be referred to as a front or top end in the axial direction, while the other end which faces in the negative Y-axis direction will also be referred to as a base end in the axial direction. A dimension of a component or part of each of the ultrasonic sensors 1, as defined in the axial direction, will also be referred to as an axial dimension or a dimension in the axial direction.

In the following discussion, a direction perpendicular to the axial direction will also be referred to as an in-plane direction. The shape of a component or part of the ultrasonic sensors 1, as viewed on a plane extending orthogonal to the center axis line CL, will also be referred to as an in-plane shape. The in-plane direction includes a radial direction and a circumferential direction. The radial direction is defined as a direction extending radially from the center axis line CL. In other words, the radial direction is oriented at right angles to the center axis line CL and extends away from the center axis line CL. Specifically, given a point of intersection of the center axis line CL with an imaginary plane, as defined perpendicular to the center axis line CL, and an initial point that is such a point of intersection, the radial direction coincides with a direction along a half-line defined to extend from the initial point on the imaginary plane. In other words, given an imaginary circle defined on the imaginary plane, and the center of the imaginary circle lying at the point of intersection between the imaginary plane and the center axis line CL, the radial direction is a direction along the radius of the imaginary circle. The circumferential direction is defined along a circumference of the above imaginary circle extending around the center axis line CL. The location or position of a component or part of the ultrasonic sensors 1 will also be referred to as a circumferential location or position or alternatively referred to as a location or position in the circumferential direction.

The corner sensors 1C are, as clearly illustrated in FIGS. 2A to 2D, mounted in the vehicle V to have the center axis line CL substantially parallel to the thickness-wise direction of the front bumper V3 at or around the sensor attachment location in the vehicle-mounted state. The center sensors 1T are, as can be seen in FIG. 2E, mounted in the vehicle V to have the center axis line CL substantially traversing or crossing the thickness-wise direction of the front bumper V3 at or around the sensor attachment location in the vehicle-mounted state.

Sensor Body

Each of the ultrasonic sensors 1 is equipped with the sensor body 2A that is a major body thereof. The sensor body 2A includes the sensor case 3, the ultrasonic microphone 4, and the cushion 5. The sensor body 2A is attached to the front bumper V3 using the anti-vibration spacer 6, the bezel 7, and the retainer 8. The parts of each of the ultrasonic sensors 1 will be described below in detail.

Sensor Case

Figure 3A:
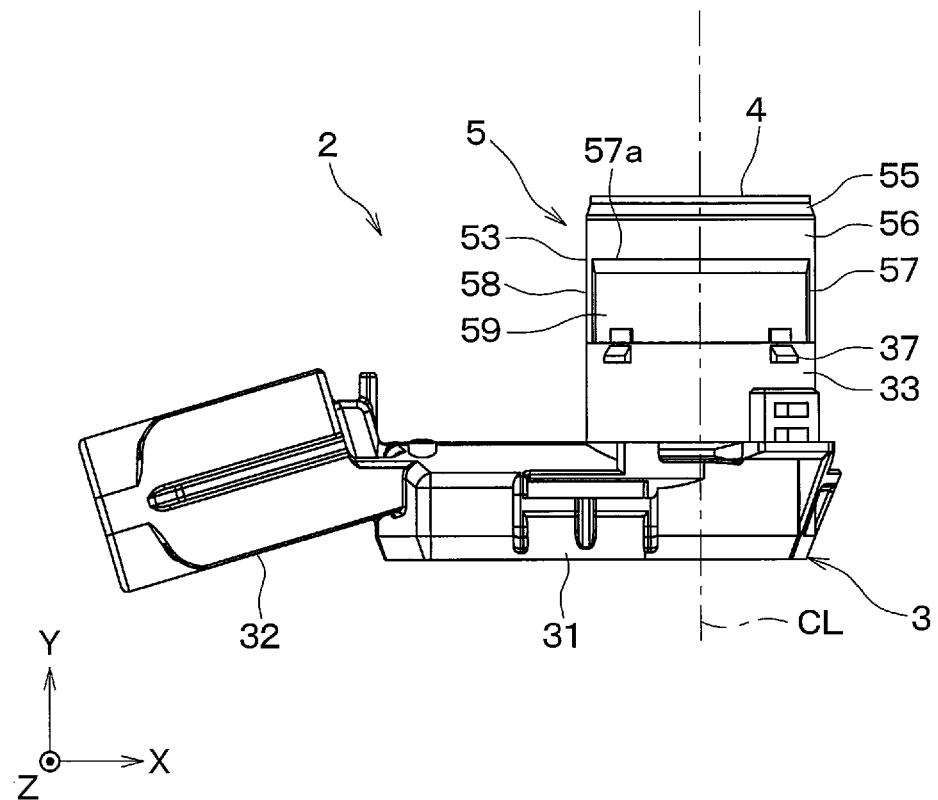
FIG. 3A is a plan view which schematically illustrates a structure of a sensor body shown in FIGS. 1C and 1D.
Figure 3B:
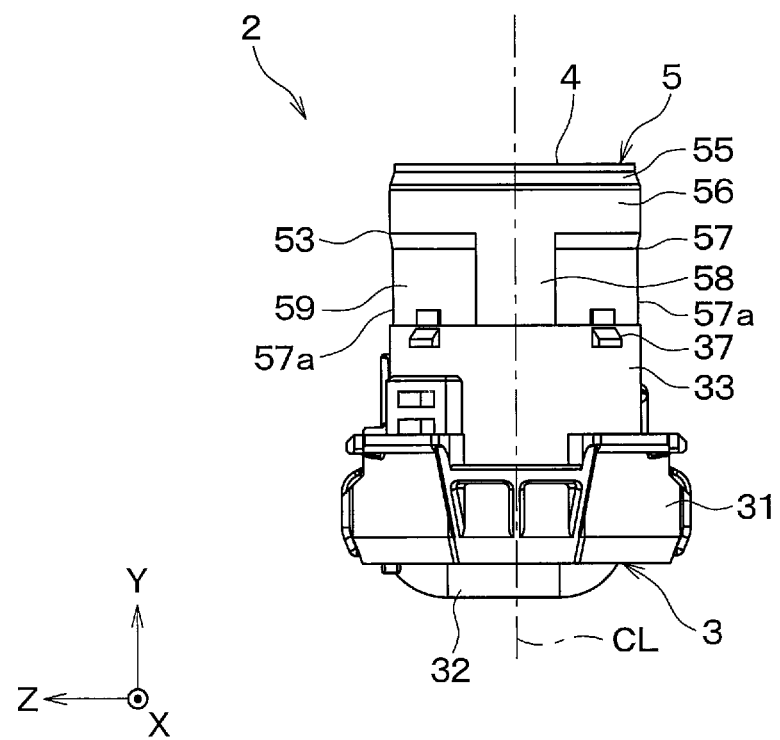
FIG. 3B is a left side view which schematically illustrates a structure of a sensor body shown in FIGS. 1C and 1D.

FIGS. 3A and 3B demonstrate the ultrasonic sensor 1 after the retainer 8 is removed from the ultrasonic sensor 1 in the bumper-mounted state, the secondary assembly is drawn into the bumper-outside space SB, and then the bevel 7 is dismounted from the secondary assembly.

Referring to FIGS. 3A and 3B, the sensor case 3 serving as a housing of the ultrasonic sensor 1, i.e., the sensor body 2A includes the box 31, the connector 32, and the microphone support 33. The sensor case 3 is made in the form of a one-piece from a hard synthetic resin, such as polybutylene terephthalate, acrylonitrile-butadiene-styrene (ABS) resin, polypropylene, polycarbonate, or polystyrene.

The box 31 is of a flat-box shape and has a length extending in the horizontal direction, a width in the vertical direction, and a thickness in the axial direction in the bumper-mounted state. The connector 32, as illustrated in FIGS. 2A and 2E, extends from an end of the box 31 (i.e., a left end of the box 31, as viewed in FIG. 3A) in the longitudinal connector direction DC, i.e., obliquely backward substantially in the horizontal direction in the vehicle-mounted state. In other words, the connector 32 is shaped to extend away from the front bumper V3 in the longitudinal connector direction DC in the bumper-mounted state.

The connector 32 is designed in the form of a receptable connector which is joinable to or detachable from a plug connector, not shown, attached to an end of a wire harness used for electrical connection with an external device, such as an electronic control unit (ECU).

The microphone support 33 extends in the axial direction from the second end (i.e., a right end, as viewed in FIG. 3A) of the box 31. The microphone support 33 is of a hollow cylindrical shape surrounding the center axis line CL. In this embodiment, the microphone support 33 is shaped to have a center axis coinciding with the center axis line CL.

Figure 4:
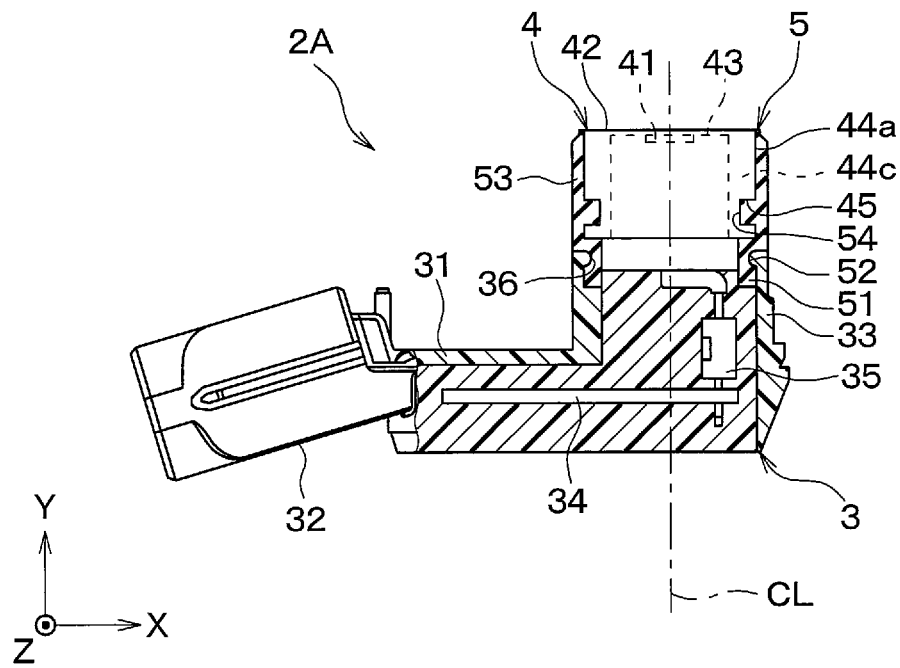
FIG. 4 is a partial sectional view which schematically illustrates a structure of a sensor body shown in FIGS. 1C and 1D.

The circuit board 34 is, as shown in FIG. 4 that is a partial sectional view of FIG. 3A, disposed inside the box 31. The circuit board 34 is electrically connected to the ultrasonic microphone 4 using the connecting conductor 35.

The microphone support 33, as illustrated in FIGS. 3A, 3B, and 4, has the cushion joint protrusion 36 and a plurality of bezel joint protrusions 37 formed on a top end portion thereof facing in the axial direction. The cushion joint protrusion 36 is shaped to protrude toward the center axis line CL from a circular cylindrical inner wall surface of the microphone support 33 which surrounds the center axis line CL. The cushion joint protrusion 36 extends in the circumferential direction.

The bezel joint protrusions 37 are made of small-sized protrusions which protrude radially inward from a circular cylindrical outer wall surface of the microphone support 33 which surrounds the center axis line CL. The bezel joint protrusions 37 are shaped to be joinable to or detachable from the bezel 7 in the assembled state. The microphone support 33 in this embodiment has the bezel joint protrusions 37 which are aligned with each other in a direction perpendicular to the axial direction and arranged at given intervals away from each other in the circumferential direction. Specifically, the four bezel joint protrusions 37 are arranged adjacent each other a equal intervals away from each other in the circumferential direction. Two of the bezel protrusions 37 which are diametrically opposed to each other across the center axis line CL are arranged to have an imaginary line, as defined to pass therethrough, which is located at 45° to the X-axis and the Z-axis.

The microphone support 33 has a single angular positioning protrusion 38 formed on the base end portion thereof. The angular positioning protrusion 38 is larger in size than the bezel joint protrusions 37 extending radially from the outer wall surface of the microphone support 33. The angular positioning protrusion 38 is arranged on a given portion of the circumference of the microphone support 33.

Ultrasonic Microphone

The ultrasonic microphone 4 is of a cylindrical outer shape extending in the axial direction. Specifically, the ultrasonic microphone 4 is in the shape of a circular cylinder whose center axis coincides with the center axis line CL.

The ultrasonic microphone 4 includes the ultrasonic device 41 and the microphone case 42. The ultrasonic device 41 is implemented by an electrical energy-to-mechanical energy transducer made of a thin-film piezoelectric device. The ultrasonic device 41 is disposed inside the microphone case 42. The microphone case 42 serves as a housing for the ultrasonic microphone 4 and is made in the form of a bottomed hollow cylinder from a metallic material, such as aluminum. Specifically, the microphone case 52 includes the diaphragm 43 and the side plate 44.

The diaphragm 53 is in the form of a thin plate having a thickness, as measured in the axial direction. The diaphragm 43 is arranged to close a front end of the side plate 44 which faces in the axial direction. In the bumper-mounted state or the vehicle-mounted state, the diaphragm 43 is oriented to have a smooth outer surface exposed to the bumper-outside space SG. The diaphragm 43 has an inner surface which is opposed to the outer surface thereof and on which the ultrasonic device 41 is fixed.

Figure 5:
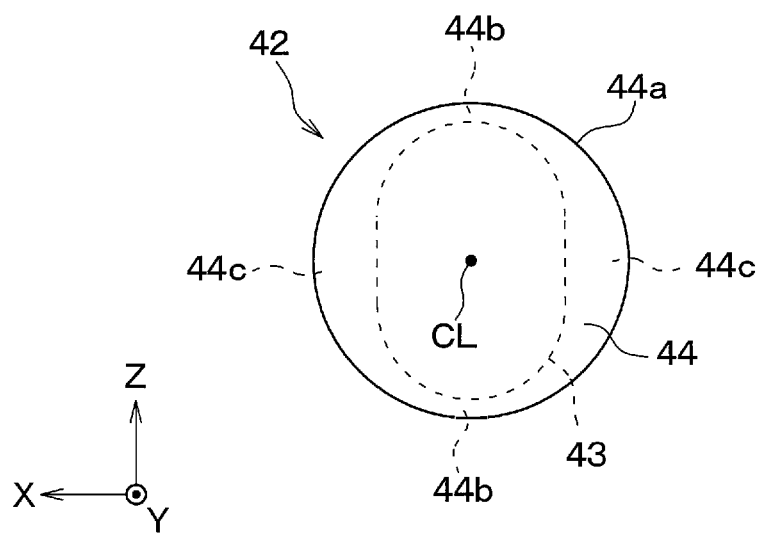
FIG. 5 is a front view which schematically illustrates a structure of a microphone case shown in FIG. 4.

The diaphragm 43 is, as can be seen in FIG. 5, shaped to have the in-plane shape with a long dimension and a short dimension substantially perpendicular to the long dimension. Specifically, the diaphragm 43 is designed to be of an ellipse or oval shape to have the long dimension oriented in the vertical direction in the vehicle-mounted state depending upon the directivity of the ultrasonic sensor 1.

The side plate 44 of the microphone case 42 is of a substantially hollow cylindrical shape and extends in the axial direction. The side plate 44 has the side surface 44a defining an outer wall surface of the ultrasonic microphone 4 is of a circular cylindrical shape around the center coinciding with the center axis line CL.

The side plate 44 of the microphone case 42 includes the thin-walled portions 44b and the thick-walled portions 44c. The thin-walled portions 44b lie at opposed ends of the length of the diaphragm 43. The thin-walled portions 44b are aligned with each other in the vertical direction in the vehicle-mounted state and diametrically opposed to each other across the center axis line CL. The thick-walled portions 44c coincide with portions of the diaphragm 43 which are opposed to each other in the width-wise direction of the diaphragm 43. The thick-walled portions 44c are arranged adjacent each other in the horizontal direction and symmetrically opposed to each other across the center axis line CL.

The side plate 44 has a pair of joint grooves 45 formed therein. The joint grooves 45 are designed in the form of square grooves and extend parallel to the Z-axis direction in the drawings. The joint grooves 45 are formed in the thin-walled portions 44c. The joint grooves 45 are arranged symmetrically with respect to the center axis line CL.

Cushion

The cushion 5 is, as illustrated in FIGS. 3A, 3B, and 4, made in the form of a seamless one-piece unit from an elastic synthetic resin, such as silicon rubber. Specifically, the cushion 5 in this embodiment is designed as a component of the sensor body 2A that is the primary assembly and mounted in the sensor body 2A along with the ultrasonic microphone 4.

The cushion 5 is shaped in the form of a hollow cylinder surrounding the center axis line CL. Specifically, the cushion 5 in this embodiment is of a hollow cylindrical shape centered at the center axis line CL and has an outer diameter substantially identical with that of the microphone support 33. The cushion 5 also has an inner diameter identical with the outer diameter of the side plate 44. The cushion 5 also has an axial dimension larger than that of the ultrasonic microphone 4.

The cushion 5 includes the supported portion 51 which has formed therein the joint groove 52 opening in the radial direction. The joint groove 52 is shaped to achieve a mechanical joint to the joint protrusion 36 of the microphone support 33. The joint groove 42 extends in the circumferential direction.

The cushion 5 also includes the microphone housing 53 located closer to the top end thereof than the supported portion 51 is in the axial direction. The microphone housing 53 is shaped to have the ultrasonic microphone 4 disposed substantially fully therein without protruding outside the microphone housing 53 in the axial direction. In other words, the microphone housing 53 has a cylindrical inner chamber contoured to conform with an outer shape of the ultrasonic microphone 4 to cover the side surface 44a of the ultrasonic microphone 4.

The microphone housing 53 is equipped with a pair of joint protrusions 54. The joint protrusions 54 are diametrically opposed to each other through the center axis line CL. The joint protrusions 54 are countered to achieve mechanical fits the quadrangular joint grooves 45 and extend toward the center axis line CL. Each of the joint protrusions 54 has a rectangular cross section and also extends in the Z-axis direction as viewed in the drawings.

As apparent from the above discussion, the cushion 5 which has the base end and the front end opposed to the base end in the axial direction is secured at the base end to the sensor case 3 and elastically retains the ultrasonic microphone 4 in the front end. Each of the ultrasonic sensors 1 is, therefore, designed to have the ultrasonic microphone 4 elastically retained by the sensor case 3 using the cushion 5, thereby minimizing transmission of mechanical vibration between the sensor case 3 and the ultrasonic microphone 4.

The cushion 5 is installed in each of the ultrasonic sensors 1 and arranged between the bezel 7C and the ultrasonic microphone 4 in the vehicle-mounted state. The bezel 7C is arranged to surround the side surface 44a of the ultrasonic microphone 4. The cushion 5 is located between the ultrasonic microphone 4 and the front bumper V3 to absorb mechanical vibration transmitting between the ultrasonic microphone 4 and the front bumper V3.

The microphone housing 53 of the cushion 5 includes the front end 55, the first cylinder 56, and the second cylinder 57. The front end 55, the first cylinder 56, and the second cylinder 57 are arranged in this order in the axial direction.

The front end 55 is defined by an end of the length of the cushion 5 facing in the axial direction and shaped to have a cylindrical inner wall and a frusto-conical outer wall tapering in the axial direction.

The first cylinder 56 is located adjacent to the front end 55 in the axial direction and closer to the front end of the cushion 5 than the second cylinder 57 is. The first cylinder 56 is held between the ultrasonic microphone 4 and the bezel 7 in direct contact therewith. In other words, the first cylinder 56 is shaped to have a maximum thickness substantially equal to an interval between the side surface 44a of the ultrasonic microphone 4 and the bezel 7 in the assembled state. Specifically, the first cylinder 56 is of a circular cylindrical shape and has a constant thickness, i.e., a constant radial dimension. To say it in a different way, the first cylinder 56 is placed in abutment with entire circumferences of the ultrasonic microphone 4 and the bezel 7.

The second cylinder 57 is located on the base end side of the microphone housing 53 adjacent the first cylinder 56. The second cylinder 57 has formed therein a pair of recesses 57a opening in the radial direction. The recesses 57a are symmetrically opposed to each other across the center axis line CL.

The second cylinder 57 includes the large-diameter portions 58 and the small-diameter portions 59. The large-diameter portions 58 are held between the ultrasonic microphone 4 and the bezel 7 in contact with the ultrasonic microphone 4 and the bezel 7. Specifically, each of the large-diameter portions 58 is of a partial cylindrical shape and has a maximum thickness substantially identical with an interval between the side surface 44a of the ultrasonic microphone 4 and the bezel 7 in the assembled state. Each of the large-diameter portions 58 is shaped to have an inner wall and an outer wall and substantially identical in inner and outer diameters, as centered at the center axis line CL, with the first cylinder 56.

The small-diameter portions 59 are arranged adjacent to the large-diameter portion 58 in the axial direction and have an outer diameter, as centered at the center axis line CL, which is smaller than that of the large-diameter portion 58. The small-diameter portions 59 are thin-walled portions of the second cylinder 57 which have thicknesses smaller than that of the large-diameter portion 58 and are created by forming the recesses 57a in the second cylinder 57. The small-diameter portions 59 coincide with the recesses 57a in the radial direction. In other words, each of the small-diameter portions 59 is shaped to create a clearance or air gap between itself and the bezel 7 which is larger than that between each of the large-diameter portions 58 and the bezel 7. The small-diameter portions 59 has an inner wall centered at the center axis line CL and has an inner diameter substantially identical with that of the first cylinder 56.

The two large-diameter portion 58 are opposed to each other across the center axis line CL. Similarly, the two small-diameter portion 59 are opposed to each other across the center axis line CL. The large-diameter portions 58 and the small-diameter portions 59 are alternately arranged adjacent to each other in the circumferential direction. In other words, each of the large-diameter portions 58 is disposed between the diametrically opposed small-diameter portions 59. The cushion 5 is shaped to have a line, as defined to pass through the large-diameter portions 58 diametrically opposed to each other across the center axis line CL, which extends perpendicular to a line, as defined to pass through the small-diameter portion 59 diametrically opposed to each other across the center axis line CL.

Each of the large-diameter portions 58 is designed to have a circumferential dimension smaller than those of the small-diameter portions 59. The large-diameter portions 58 are, as can be seen in FIGS. 3A to 5, located in coincidence with the ends of the width of the diaphragm 43, while the small-diameter portions 59 are located in coincidence with the ends of the length of the diaphragm 43.

Anti-Vibration Spacer

Figure 6A:
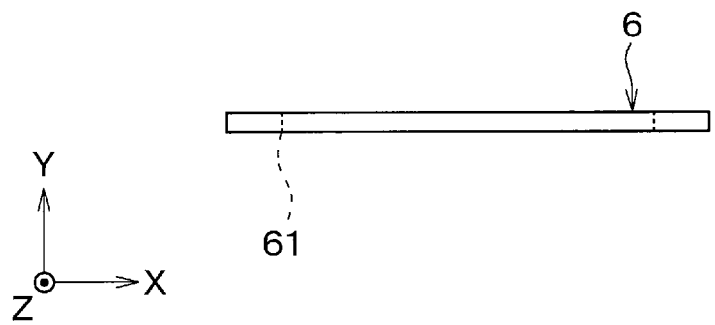
FIG. 6A is an enlarged plan view which illustrates an anti-vibration spacer shown in FIGS. 2A and 2E.
Figure 6B:
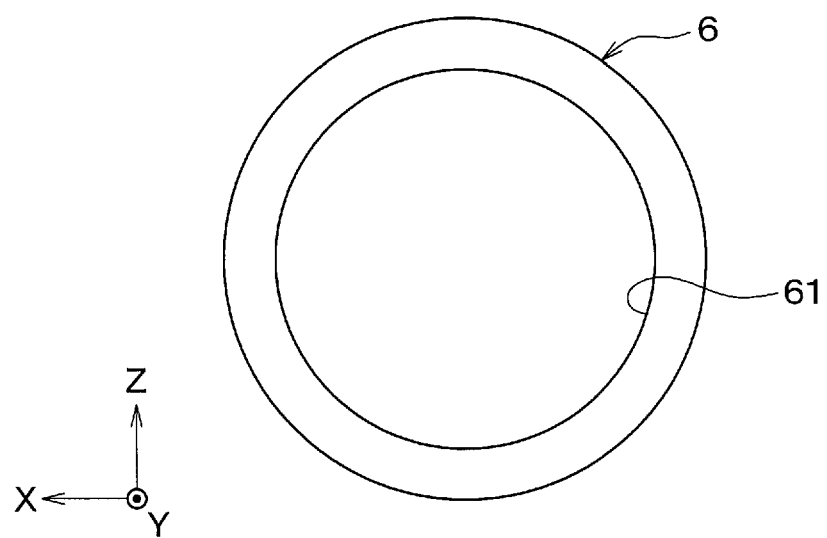
FIG. 6B is a front view of the anti-vibration spacer in FIG. 6A.

Referring to FIGS. 6A and 6B, the anti-vibration spacer 6 is in the shape of a thin ring and has a thickness as measured in the axial direction. The anti-vibration spacer 6 is made from an elastic synthetic resin, such as silicon rubber. Specifically, the anti-vibration spacer 6 is in the form of a disc plate and has the spacer through-hole 61 formed in the center of the disc plate.

The anti-vibration spacer 6 is, as clearly illustrated in FIG. 2A, arranged between the flange 71, as will be described later in detail, of the bezel 7 and the front bumper V3 to minimize the transmission of mechanical vibration between the bezel 7 and the front bumper V3 in the vehicle-mounted state. Specifically, the anti-vibration spacer 6 is firmly retained by the reverse surface 71a of the flange 71 which faces the front bumper V3 and the outer bumper surface V31 in the bumper-mounted state.

Bezel

Figure 7A:
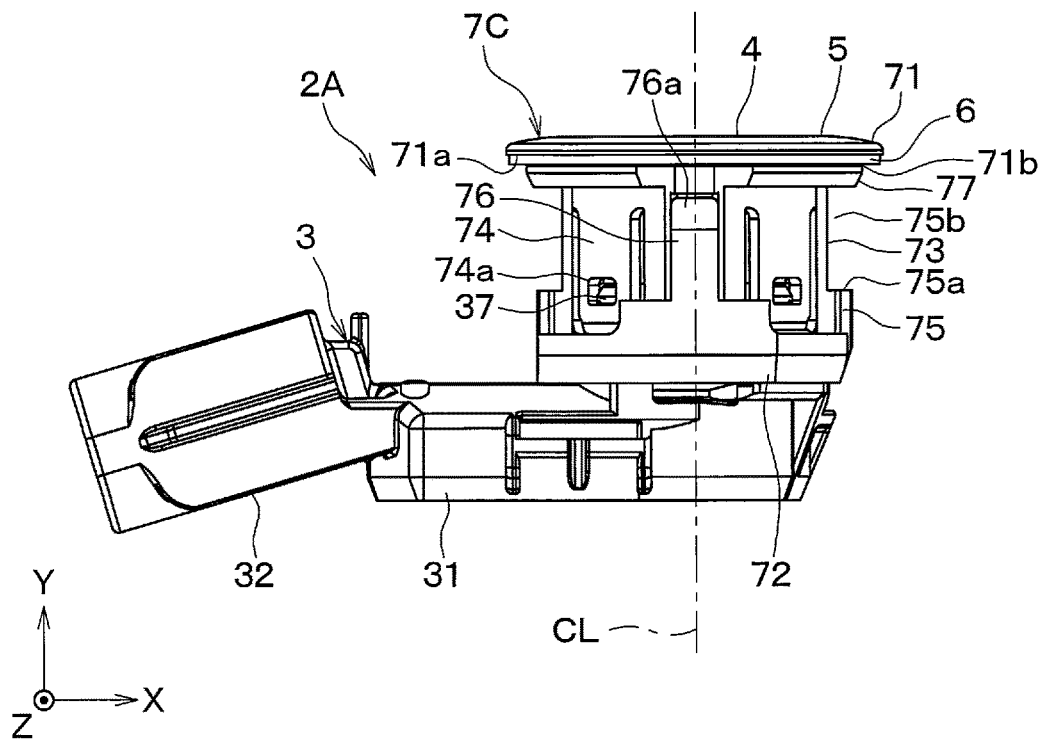
FIG. 7A is a plan view which schematically illustrates a secondary assembly of a sensor body, an anti-vibration spacer, and a corner bezel shown in FIG. 2A.
Figure 7B:
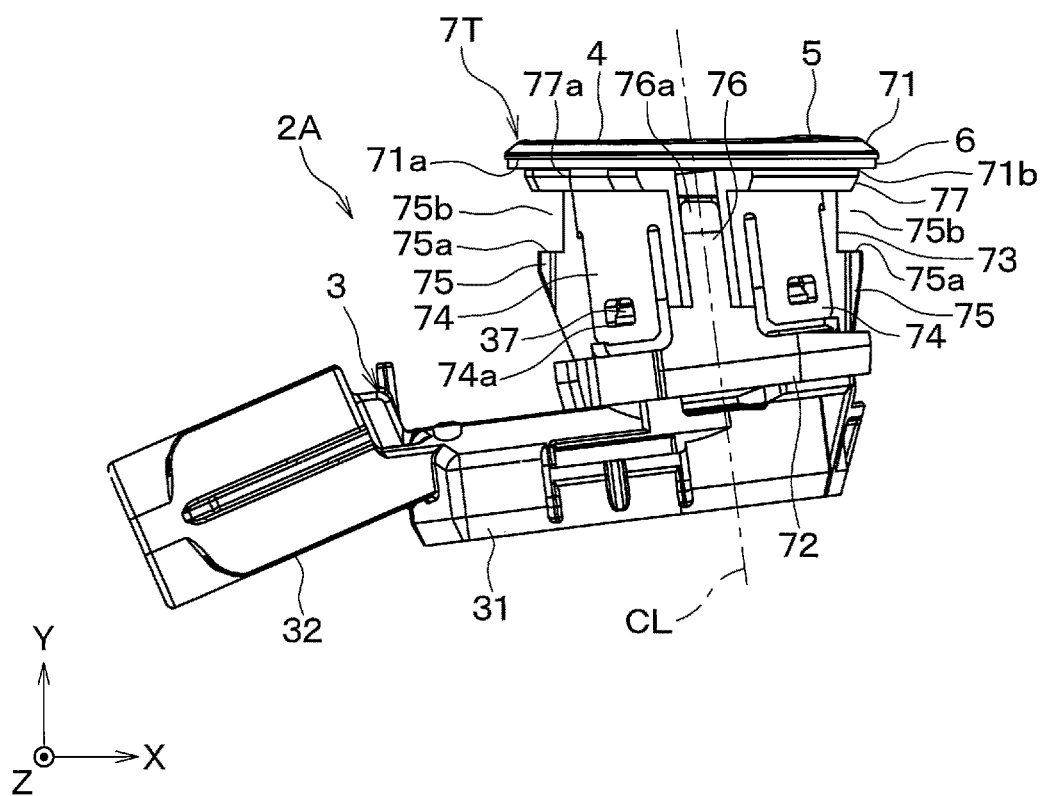
FIG. 7B is a plan view which schematically illustrates a secondary assembly of a sensor body, an anti-vibration spacer, and a center bezel shown in FIG. 2E.
Figure 8A:
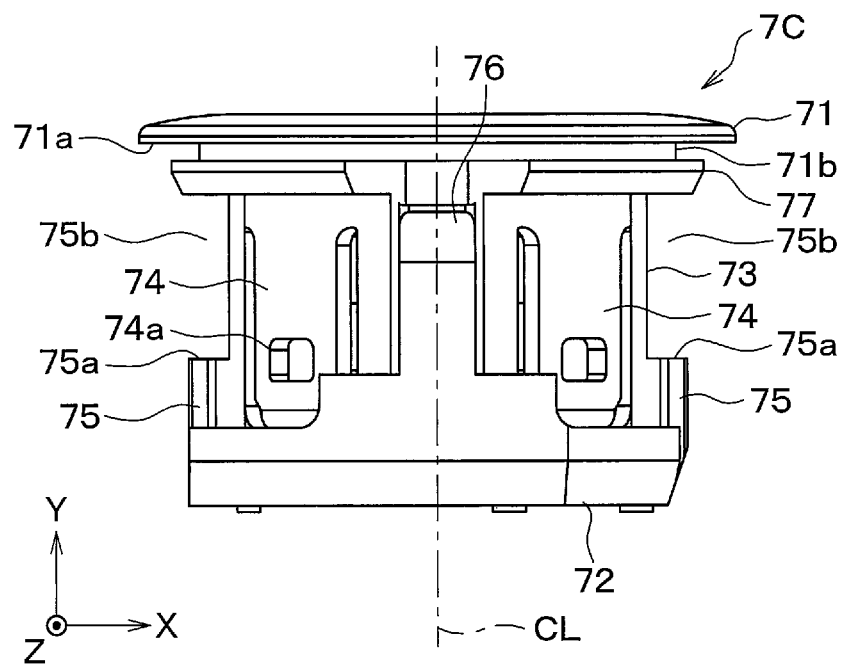
FIG. 8A is an enlarged plan view which illustrates a corner bezel shown in FIG. 7A.
Figure 8B:
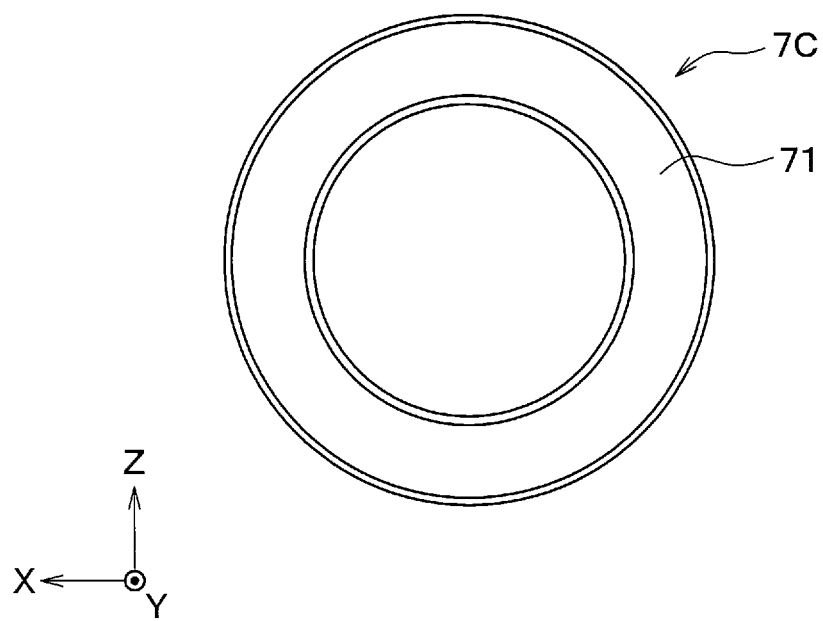
FIG. 8B is a front view which illustrates the corner bezel shown in FIG. 8A.
Figure 8C:
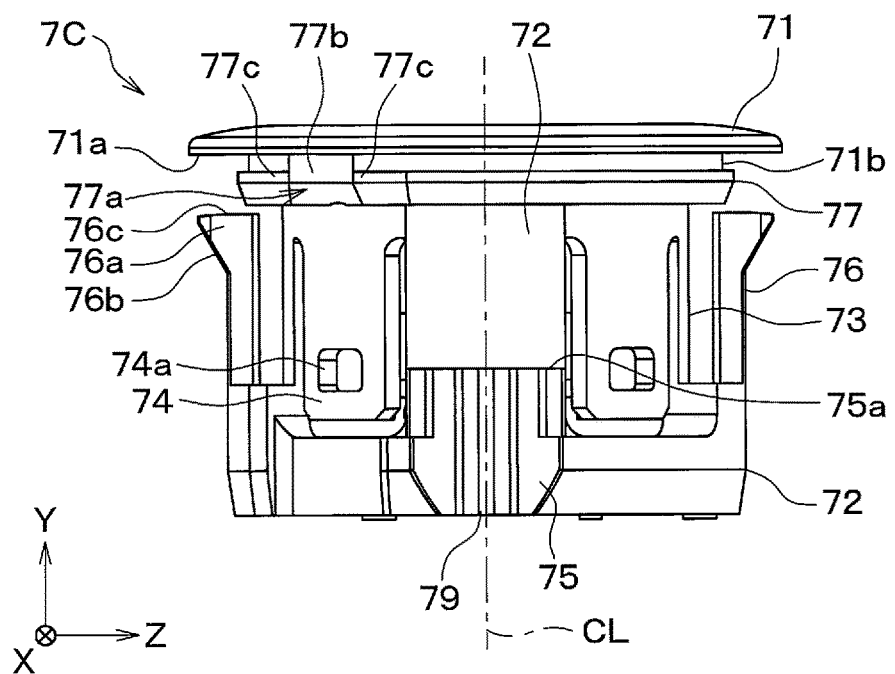
FIG. 8C is a right side view which illustrates the corner bezel shown in FIG. 8A.
Figure 8D:
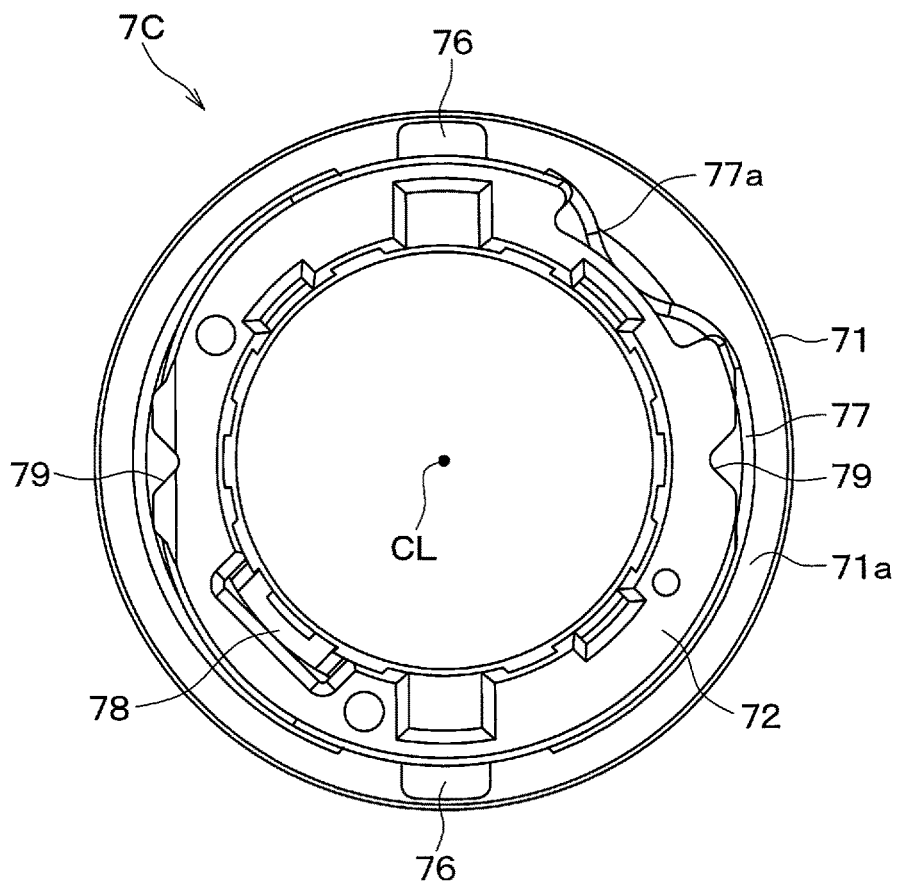
FIG. 8D is a back view which illustrates the corner bezel shown in FIG. 8A.
Figure 9:
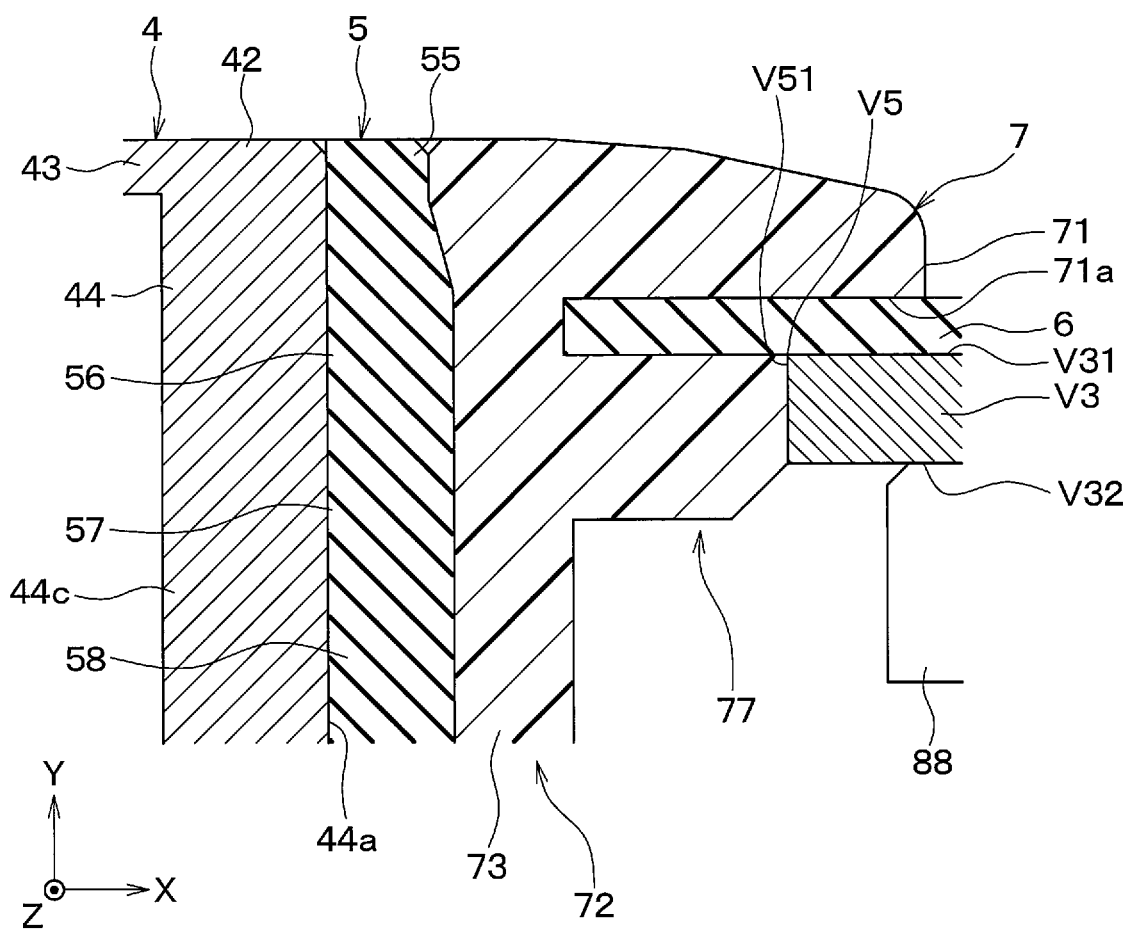
FIG. 9 is an enlarged sectional view which illustrates a portion of a bezel shown in FIG. 1D and a region around the bezel in a vehicle-mounted state.
Figure 10A:
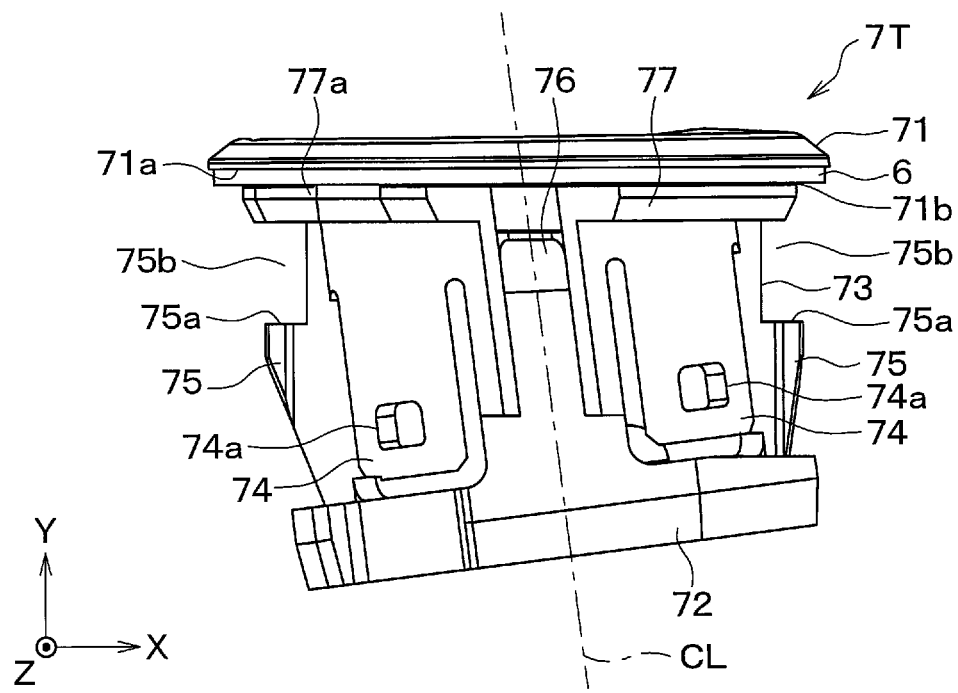
FIG. 10A is an enlarged plan view which illustrates a center bezel shown in FIG. 7B.
Figure 10B:
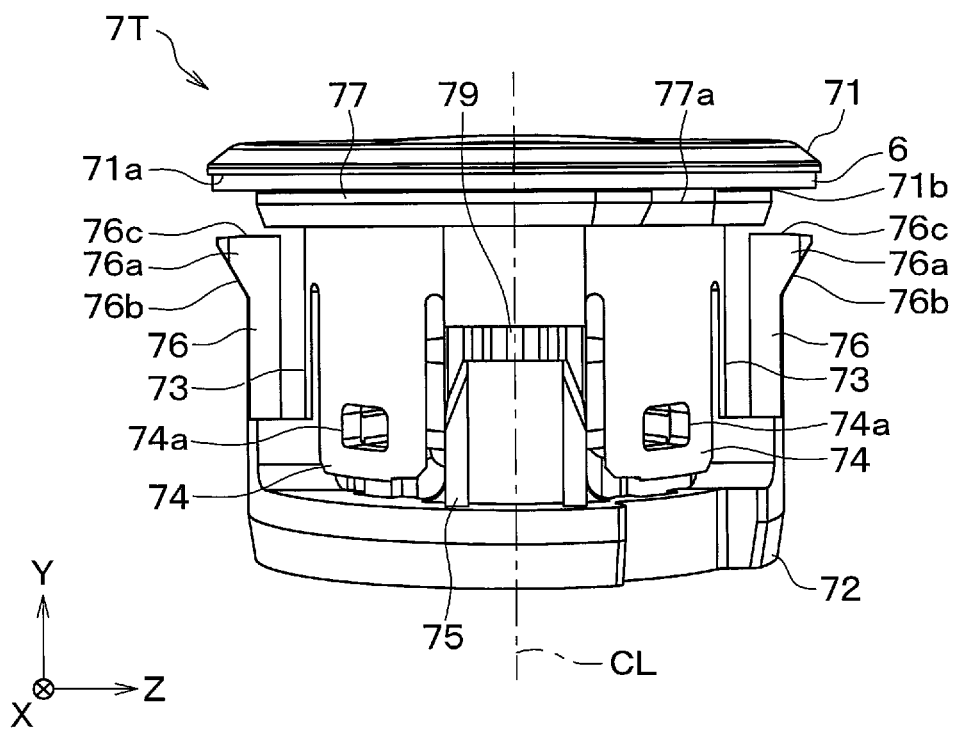
FIG. 10B is a front view of a center bezel shown in FIG. 10A.
Figure 10C:
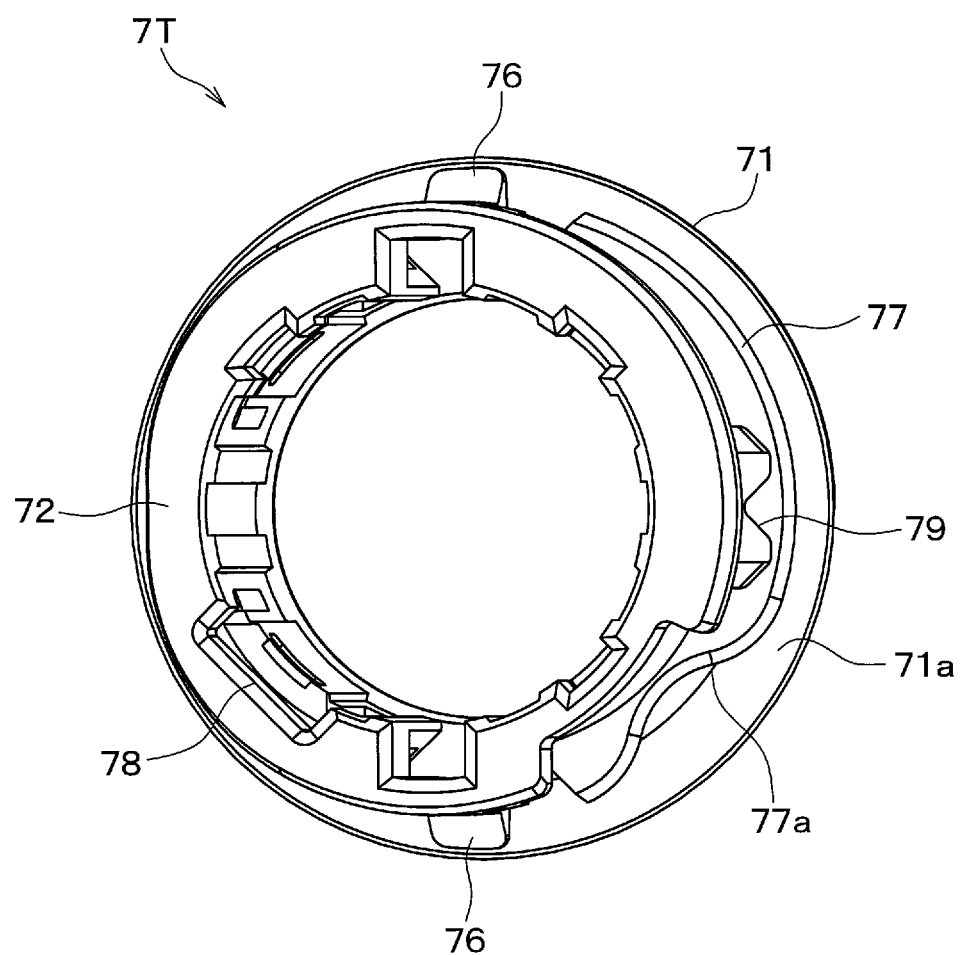
FIG. 10C is a perspective view which illustrates a back surface of the center bezel in FIG. 10A.

FIG. 7A illustrates the secondary assembly of each of the corner sensors 1C shown in FIG. 2A. FIG. 7B illustrates the secondary assembly of each of the center sensors 1T shown in FIG. 2E. FIGS. 8A to 8D schematically illustrate the structure of the corner bezel 7C shown in FIG. 7A. FIG. 9 is an enlarged sectional view of a region around the flange 71 of the bezel 7 in the bumper-mounted state or the vehicle-mounted state. FIGS. 10A to 10C schematically illustrate the structure of the center bezel 7T shown in FIG. 7B.

The structure of the bezel 7, which will also be referred to as a cylindrical member in this disclosure, will be described below with reference to the drawings. The bezel 7 serving as a sensor attachment is used to attach the ultrasonic sensor 1 to the front bumper V3 that is a plate-like vehicle body member. The bezel 7 is made in the form of a one-piece member from synthetic resin and disposed inside the mounting hole V5 shown in FIG. 1B in the bumper-mounted state.

The first orientation of one of the corner sensors 1C is, as illustrated in FIG. 1D, achieved by engagement of the corner bezel 7C with the bumper joint V52 of the first mounting hole V501, while the second orientation of the other corner sensors 1C is also achieved by engagement of the corner bezel 7C with the bumper joint V52 of the second mounting hole V502.

The third orientation of one of the center sensors 1T is achieved by engagement of the center bezel 7T with the bumper joint V52 of the third mounting hole V503, while the fourth orientation of the other center sensor 1T is achieved by engagement of the center bezel 7T with the bumper joint V52 of the fourth mounting hole V504.

Corner Bezel

The structure of the corner bezel 7C which is also referred to as a first cylindrical member in this disclosure will be described below. The corner bezel 7C has the flange 71 disposed on the axial end thereof. The flange 71 is in a ring shape and has a thickness as measured in the axial direction. The flange 71 extends in the radial direction. The corner bezel 7C is shaped to have a normal line, as defined to be perpendicular to the reverse surface 71a of the flange 71, which extends substantially parallel to the center axis line CL.

The flange 71 is of a disc shape and has a circular through-hole formed in the center thereof. The flange 71 has an outer diameter larger than an inner diameter of the mounting hole V5. The flange 71 is, therefore, as illustrated in FIG. 2A, arranged to face a portion of the outer bumper surface V31 around the mounting hole V5 through the anti-vibration spacer 6 in the bumper-mounted state.

The flange 71 has an inner diameter substantially identical with an outer diameter of the front end 55 of the cushion 5. The flange 71 is, as clearly illustrated in FIG. 9, shaped to hold the front end 55 of the cushion 5 between itself and the side surface 44a of the microphone case 42.

The bezel 7 has formed therein the spacer housing groove 71b which is located closer to the base end thereof than the flange 71 is in the axial direction. The spacer housing groove 71b is a groove in which the anti-vibration spacer 6 is disposed. The spacer housing groove 71b has an opening facing in the radial direction. The spacer housing groove 73 occupies an entire circumference of the cylinder 72. The spacer housing groove 71b has a width (i.e., a dimension as measured in the axial direction) substantially identical with the thickness of the anti-vibration spacer 6 and also has a depth (i.e., a dimension as measured in the radial direction) which defines an inner diameter of the spacer housing groove 71b substantially identical with the diameter of the spacer through-hole 61 of the anti-vibration spacer 6. The spacer housing groove 73 occupies an entire circumference of the bezel 7.

The spacer housing groove 71b is located between the flange 71 and the cylinder 72. In other words, the flange 71 is disposed on the axial front end of the cylinder 72 and extends in the radial direction. The flange 71 and the cylinder 72 are made in the form of a seamless one-piece member from the same materials.

The cylinder 72 is disposed in the mounting hole V5 and surrounds the ultrasonic microphone 4 and the cushion 5 in the assembled state or the bumper-mounted state. The cylinder 72 has an outer diameter slightly smaller than the inner diameter of the mounting hole V5 and an inner diameter slightly larger than the outer diameter of the microphone support 33. The cylinder 72 has the cylindrical main body 73 which includes a central portion thereof in the axial direction. The main body 73 extends along the center axis line CL.

The main body 73 is equipped with the strip-like sensor joints 74. Each of the sensor joints 74 is made of a strip member in the form of a cantilever and has a thickness in the radial direction. Each of the sensor joints 74 extends from an axial front end toward a base end of the main body 73. In other words, each of the sensor joints 74 has a length with a front end and a base end. The front end of each of the sensor joints 74 is a fixed end, while the base end is an unsupported end (also called free end) which is elastically deformable so that it moves in the radial direction. The sensor joints 74 of the corner bezel 7C extend substantially parallel to a normal line to the reverse surface 71a of the flange 71.

Each of the sensor joints 74 has the joint hole 74a which is formed close to the free end and passes through the thickness thereof. The joint holes 74a detachably engage the bezel joint protrusions 37 of the microphone support 33 in the assembled state. The main body 73 is equipped with as many sensor joints 74 as the bezel joint protrusions 37. The sensor joints 74 are arranged adjacent each other in the circumferential direction. In this embodiment, the four sensor joints 74 are located at equal intervals away from each other in the circumferential direction. The sensor joints 74 of the corner bezel 7C are identical in length or axial dimension with each other.

The main body 73 is equipped with the protrusions 75. The protrusions 75 extend from the main body 73 in a direction crossing the center axis line CL. In this embodiment, the protrusions 75 are joined integrally with the main body 73. Specifically, the protrusions 75 and the main body 73 are made in the form of a seamless one-piece member from the same materials.

The bezel 7 has a pair of protrusions 75 formed thereon. The protrusions 75 are symmetrically opposed to each other across the center axis line CL. In other words, the protrusions 75 bulge away from the center axis line CL. Each of the protrusions 75 is located between the two adjacent sensor joints 74.

Each of the protrusions 75 bulges in a direction in which the flange 71 extends radially. Specifically, the protrusions 75 of the corner bezel 7C extends from the axial based end of the main body 73 in the radial direction. Each of the protrusions 75 has the axial front end with the retainer contact surface 75a. The retainer contact surface 75a is shaped to be smooth or flat and oriented to have a normal line parallel to the center axis line CL. In other words, each of the retainer contact surfaces 75a extend substantially parallel to the reverse surface 71a of the flange 71.

The corner bezel 7C also has formed therein a pair of retainer fit grooves 75b which are located closer to the front end than the retainer contact surface 75a is in the axial direction. The retainer fit grooves 75b have openings which face in the radial direction and in which the retainer 8 is fit to secure the ultrasonic sensor 1 to the front bumper V3. The protrusions 75 hold the retainer 8, as inserted into the retainer fit grooves 75b, between itself and the inner bumper surface V32 in the bumper-mounted state.

The retainer fit grooves 75b are diametrically or symmetrically opposed to each other across the center axis line CL. Each of the retainer fit grooves 75b extends in the X-axis direction in the form of a square groove. The protrusions 75 are, as can be seen in FIG. 1D, configured to orient a mounting/dismounting direction of the retainer 8 parallel to the Z-axis direction in the drawings. The mounting/dismounting direction is a direction in which the retainer 8, as used as fasteners, are mounted on or dismounted from the bezel 7.

The cylinder 72 also includes a pair of temporary assembling strips 76. Each of the temporary assembling strips 76 is designed in the form of a cantilever and has a thickness in the radial direction. Each of the temporary assembling strips 76 extends in the axial direction from the base end of the cylinder 72 toward the flange 71. In other words, each of the temporary assembling strips 76 has the base end in the form of a fixed end and the front end in the form of an unsupported end (i.e., free end) which are opposed to each other in the axial direction, so that the free end of each of the temporary assembling strips 76 is elastically deformable in the radial direction.

The bezel 7 in this embodiment, as described above, has the two temporary assembling strips 76 which are diametrically opposed to each other across the center axis line CL. Specifically, the bezel 7 is shaped to have a line, as defined to pass through the temporary assembling strips 76 diametrically opposed to each other across the center axis line CL, which extends perpendicular to a line, as defined to pass through the protrusions 75 diametrically opposed to each other across the center axis line CL.

Each of the temporary assembling strips 76 is disposed between the two adjacent sensor joints 74 in the circumferential direction. In other words, the first one of the sensor joints 74, the first one of the protrusions 75, the second one of the sensor joints 74, the first one of the temporary assembling strips 76, the third one of the sensor joints 74, and the second one of the protrusions 75 are arranged in this order at equal intervals away from each other in the circumferential direction. The second one of the protrusions 75, the fourth one of the sensor joints 74, the second one of the temporary assembling strips 76, and the first one of the sensor joints 74 are arranged in this order at equal intervals away from each other in the circumferential direction.

Each of the temporary assembling strips 76 has the temporary assembling protrusion 76a which is formed in the free end, i.e., the front end and bulges in the radial direction. The temporary assembling protrusions 76a are configured to retain the secondary assembly in a temporarily assembled state. The temporarily assembled state, as referred to herein, is a state where the bezel 7 of the secondary assembly is inserted into the mounting hole V5, so that the secondary assembly is temporarily retained by the front bumper V3 in a given temporary orientation. The temporary orientation, as referred to herein, is an orientation of the secondary assembly where the anti-vibration spacer 6 is arranged in close proximity to or in direct abutment with the outer bumper surface V31 of the front bumper V3, and the connector 32 is, as can be seen in FIG. 1D, oriented to extend in the X-axis direction in a rear view thereof. The temporarily assembled state is equivalent to a state where the retainer 8 is removed from the ultrasonic sensor 1 in the vehicle-mounted state.

Specifically, each of the temporary assembling protrusions 76a is of a wedge-shape with the slant surface 76b and the flange-facing surface 76c. The slant surface 76b is a surface of the temporary assembling protrusion 76a which is exposed in the radial direction and extends away from the center axis line CL toward the front end of the temporary assembling protrusion 76a. The flange-facing surface 76c is an end surface of the temporary assembling protrusion 76a which faces the reverse surface 71a of the flange 71.

The main body 73 has the front protrusion 77 which is located on a front end portion thereof and integrally joined thereto. The front protrusion 77 bulges in the radial direction. The front protrusion 77 is located on the axially front side of the cylinder 72 and extends in the circumferential direction of the cylinder 72. In this embodiment, the main body 73 and the front protrusion 77 are made from the same materials in the form of a seamless one-piece member. The front protrusion 77 is, as can be seen in FIG. 9, located in proximity to the inner surface V51 of the mounting hole V5 to be directly contactable therewith in the bumper-mounted state.

The front protrusion 77 is arranged between the spacer housing groove 71b and the retainer fit grooves 75b in the axial direction. Specifically, the front protrusion 77 abuts the spacer housing groove 71b and the retainer fit grooves 75b in the axial direction. The spacer housing groove 71b, therefore, occupies an air gap between the flange 71 and the front protrusion 77. Each of the retainer fit grooves 75b occupies space between a corresponding one of the protrusions 75 and the front protrusion 77.

The front protrusion 77 is equipped with the bezel joint 77a serving as a device joint. The bezel joint 77a is configured to achieve firm engagement with the bumper joint V52 illustrated in FIG. 1D as a vehicle body joint.

Specifically, the bezel joint 77a is made of raised and recessed portions of the bezel 7 in a concave-convex shape and shaped to conform with the bumper joint V52.

The circumferential position of the bezel joint 77a of the corner bezel 7C in the assembled state is set to coincide with that of the first bezel joint protrusion 37. Of two of the bezel joint protrusions 37 which are located closer to the connector 32 than the center axis line CL is, one bulging in the negative Z-axis direction constitutes the first bezel joint protrusion 37. In other words, the bezel joint 77a of one of the corner bezels 7C is configured to achieve engagement with the first mounting joint V52 of the first mounting hole V501 illustrated in FIG. 1D, thereby setting the mounted orientation of the corner sensor 1C to the first orientation. The bezel joint 77a of the other corner bezel 7C is configured to achieve engagement with the bumper joint V52 of the second mounting hole V502, thereby setting the mounted orientation of the corner sensor 1C to the second orientation.

The bezel joint 77a includes the bezel recess 77b and a pair of bezel protrusions 77c. The bezel recess 77b is contoured to fit the bumper protrusion V53. The bezel recess 77b is defined by a recess in the corner bezel 7C which opens in the radial direction and is located in a given portion of the front protrusion 77 extending in the circumferential direction. The bezel protrusions 77c are contoured to fit the bumper recesses V54. The bezel protrusions 77c are defined in a convex shape by forming the bezel recess 77b on opposite sides thereof in the circumferential direction of the front protrusion 77.

The cylinder 72 has formed therein a single angular positioning recess 78 which is located closest to the axial base end thereof and opens in the axial direction. The angular positioning recess 78 is also arranged in a radial innermost portion of the cylinder 72 and opens inwardly to the center axis line CL. In the assembled state, the angular positioning recess 78 is contoured to fit the angular positioning protrusion 38 in the microphone support 33, in other words, defined by a recess which enables the angular positioning protrusion 38 to be fit therein.

The angular positioning recess 78 is located in a given portion of the circumference of the cylinder 72 and serves to fix an angular position of the bezel 7 around the center axis line CL relative to the sensor case 3 in the assembled state. Specifically, the circumferential position of the angular positioning recess 78 coincides with that of one of the four sensor joints 74. In other words, the angular positioning recess 78 of the corner bezel 7C is, as can be seen in FIG. 8D, located on an opposite side of the center axis line CL to the bezel joint 77a.

The cylinder 72 is equipped with the retainer joints 79. The retainer joints 79 are configured to achieve detachable engagement with the retainer 8 in the bumper-mounted state, thereby holding the retainer 8 from being undesirably dislodged from the bezel 7. Specifically, the retainer joints 79 are defined by recesses formed in the cylinder 72 which open in the radial direction and are contoured to fit protrusions formed on the retainer 8.

In this embodiment, the two retainer joints 79 are diametrically or symmetrically opposed to each other across the center axis line CL. The retainer joints 79 are provided one for each of the protrusions 75.

Center Bezel

The structure of each of the center bezels 7T which are designed as second cylindrical members in this disclosure will be described below. Each of the center bezels 7T has substantially the same structure as that of the corner bezel 7C except for described below.

The following discussion will mainly refer to parts of the center bezel 7T which are different from those of the corner bezel 7C. Parts of the corner bezel 7C and the center bezel 7T which are substantially identical in function or mechanical structure with each other are denoted by the same reference numeral or symbols. The explanation of structural elements of the corner bezel 7C will, therefore, be applied to structural elements of the center bezel 7T expressed using the same reference numerals or symbols as those for the corner bezel 7C.

The corner bezel 7C and the center bezel 7T are, as can be seen in FIGS. 2A and 2E, different in angle at which the center axis line CL crosses or intersects the front bumper V3 in the bumper-mounted state from each other. Specifically, the center bezel 7T is, as clearly illustrated in FIG. 10A, oriented to have a normal line to the reverse surface 71a of the flange 71 which crosses the center axis line CL, not parallel to the center axis line CL. In other words, the flange 71 of the center bezel 7T extends so that it is non-parallel to the radial direction.

The cylinder 72 of the center bezel 7T is shaped to have a slant front end that is one of ends thereof opposed to each other in the axial direction and obliquely extends or crosses the center axis line CL. The flange 71 is arranged on or over the surface of the slant front end of the cylinder 72.

Each of the sensor joints 74 extends in the axial direction which crosses the normal line to the reverse surface 71a of the flange 71. A respective two of the sensor joints 74 which are arranged on opposite sides of each of the temporary assembling strips 76 in the circumferential direction are, as illustrated in FIG. 10A, shaped to have lengths or axial dimensions different from each other, while a respective two of the sensor joints 74 which are arranged adjacent to each other on the opposite sides of each of the protrusions 75 in the circumferential direction are, as illustrated in FIG. 10B, shaped to have lengths identical with each other.

One of the two protrusions 75 (which will also be referred to as the first protrusion 75), as can be seen in FIG. 10A, bulges in the positive X-axis direction along a direction in which the flange 71 protrudes, while the other protrusion 75 (which will also be referred to as the second protrusion 75) bulges in the negative X-axis direction along the direction in which the flange protrudes. The first protrusion 75 is shaped to have an axial dimension larger than that of the second protrusion 75.

Like the corner bezel 7C, the center bezel 7T has the retainer contact surface 75a extending substantially parallel to the reverse surface 71a of the flange 71. The retainer contact surface 75a of the center bezel 7T is oriented to have a normal line thereto crossing the center axis line CL.

In order to minimize the mounting error, an interval between the retainer contact surface 75a and the reverse surface 71a of the flange 71 is selected to differ between the corner bezel 7C and the center bezel 7T. The mounting error, as referred to in this case, is a mistake that the center retainer 8T is erroneously fit on the corner bezel 7C or alternatively the corner retainer 8C is erroneously fit on the center bezel 7T. The center bezel 7T is designed to have the interval between the retainer contact surface 75a and the reverse surface 71a of the flange 71 which is smaller than that of the corner bezel 7C. In other words, each of the retainer fit grooves 75b of the center bezel 7T is shaped to have a width (i.e., a dimension, as measured in the Y-axis direction) which is smaller than that of the corner bezel 7C.

Additionally, in order to minimize the mounting error, the bezel joint 77a is, as clearly illustrated in FIGS. 8D and 10C, designed to have a circumferential position relative to the angular positioning recess 78 which is difference between the corner bezel 7C and the center bezel 7T. Referring to FIG. 1D, the mounting error in this case is a mistake that the corner sensor 1C is erroneously fit in the third mounting hole V503 or the fourth mounting hole V504 or that the center sensor 1T is erroneously fit in the first mounting hole V501 or the second mounting hole V502. The bezel joint 77a of the center bezel 7T is located in alignment with one of the sensor joints 74 which is disposed between the first temporary assembling strip 76 and the first protrusion 75. The first temporary assembling strip 76 is one of the temporary assembling strips 76 which faces in the positive Z-axis direction in FIG. 10A. The first protrusion 75 is one of the protrusions 75 which is smaller in axial dimension than the others and faces in the negative X-axis direction in FIG. 10A.

The bezel joint 77a of the center bezel 7T is arranged at a circumferential position which coincides with that of the first bezel joint protrusion 37 in the assembled state. The first bezel joint protrusion 37 is one of two of the bezel joint protrusions 37 which are arranged closer to the connector 32 than the center axis line CL is. The first bezel joint protrusion 37 faces in the positive Z-axis direction. The bezel joint 77a of the center bezel 7T of one of the center sensors 1T is, as illustrated in FIG. 1D, configured to achieve engagement with the bumper joint V52 of the third mounting hole V503, thereby setting the mounted orientation of the center sensor 1T to the third orientation. The bezel joint 77a of the other center sensor 1T is configured to achieve engagement with the bumper joint V52 of the fourth mounting hole V504, thereby setting the mounted orientation of the center sensor 1T to the fourth orientation.

Retainer

The retainer 8 used as a sensor fastener in this disclosure is, as illustrated in FIGS. 1D to 2E, fit in the second assembly inserted into the mounting hole V5 in the temporarily assembled state, thereby securing the ultrasonic sensor 1 to the front bumper V3. Specifically, the retainer 8 is inserted into air gaps between the protrusions 75 and the front bumper V3 after the cylinder 72 is fit in the mounting hole V5, so that it is held between the protrusions 75 and the front bumper V3. The retainer 8 is made from synthetic resin in the form of a one-piece member.

FIGS. 11A to 11D schematically illustrate the structure of the corner retainer 8C. FIGS. 12A to 12D schematically illustrate the structure of the center retainer 8T. A back view of the center retainer 8T in FIG. 12A corresponds to that of the corner retainer 8C in FIG. 11A. A side view of the center retainer 8T in FIG. 12B corresponds to that of the corner retainer 8C in FIG. 11B. A plan view of the center retainer 8T in FIG. 12C corresponds to that of the corner retainer 8C in FIG. 11C. A front view of the center retainer 8T in FIG. 12D corresponds to that of the corner retainer 8C in FIG. 11D.

Figure 11A:
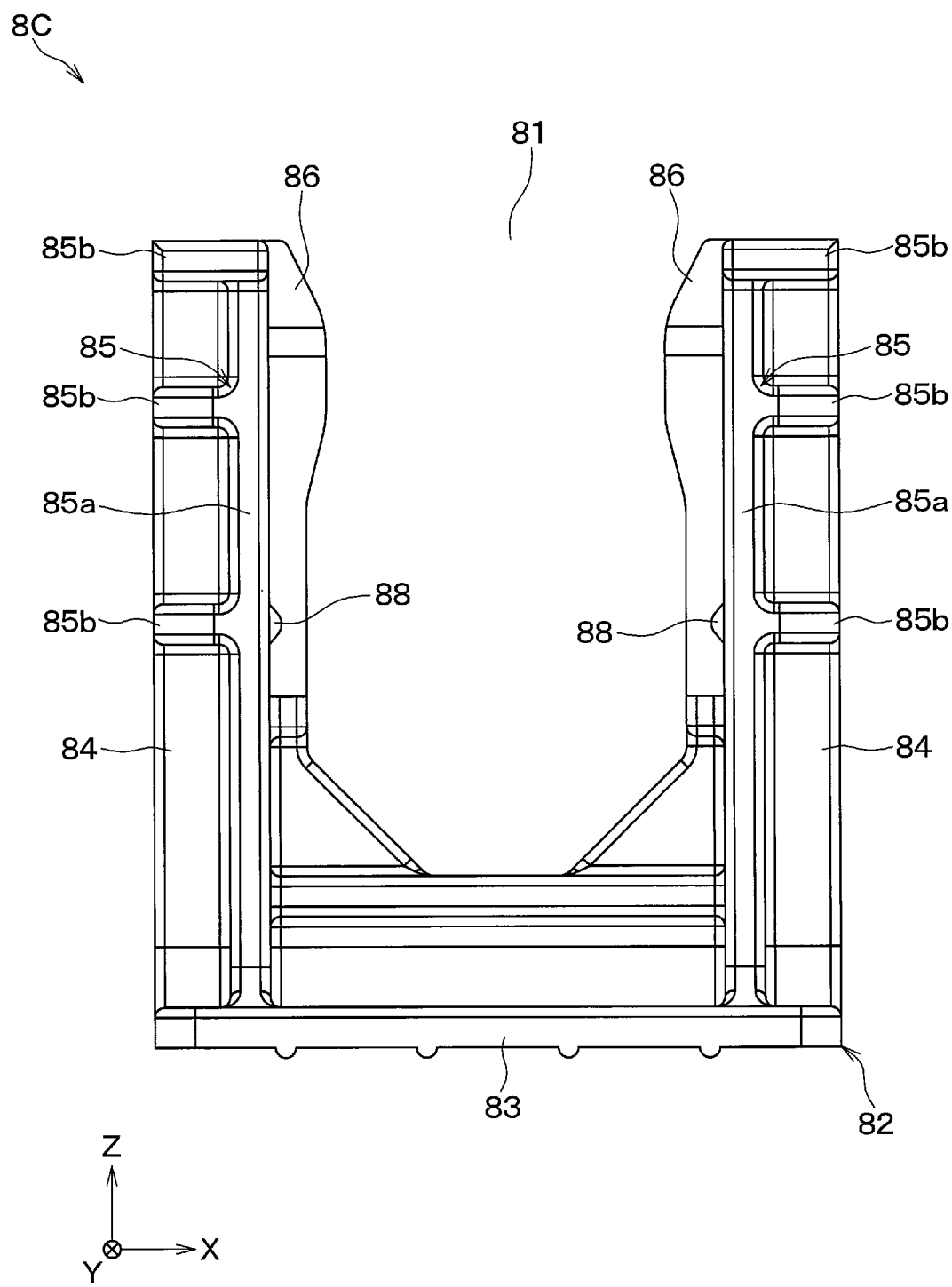
FIG. 11A is a back view which illustrates a corner retainer shown in FIGS. 2A to 2D.
Figure 12A:
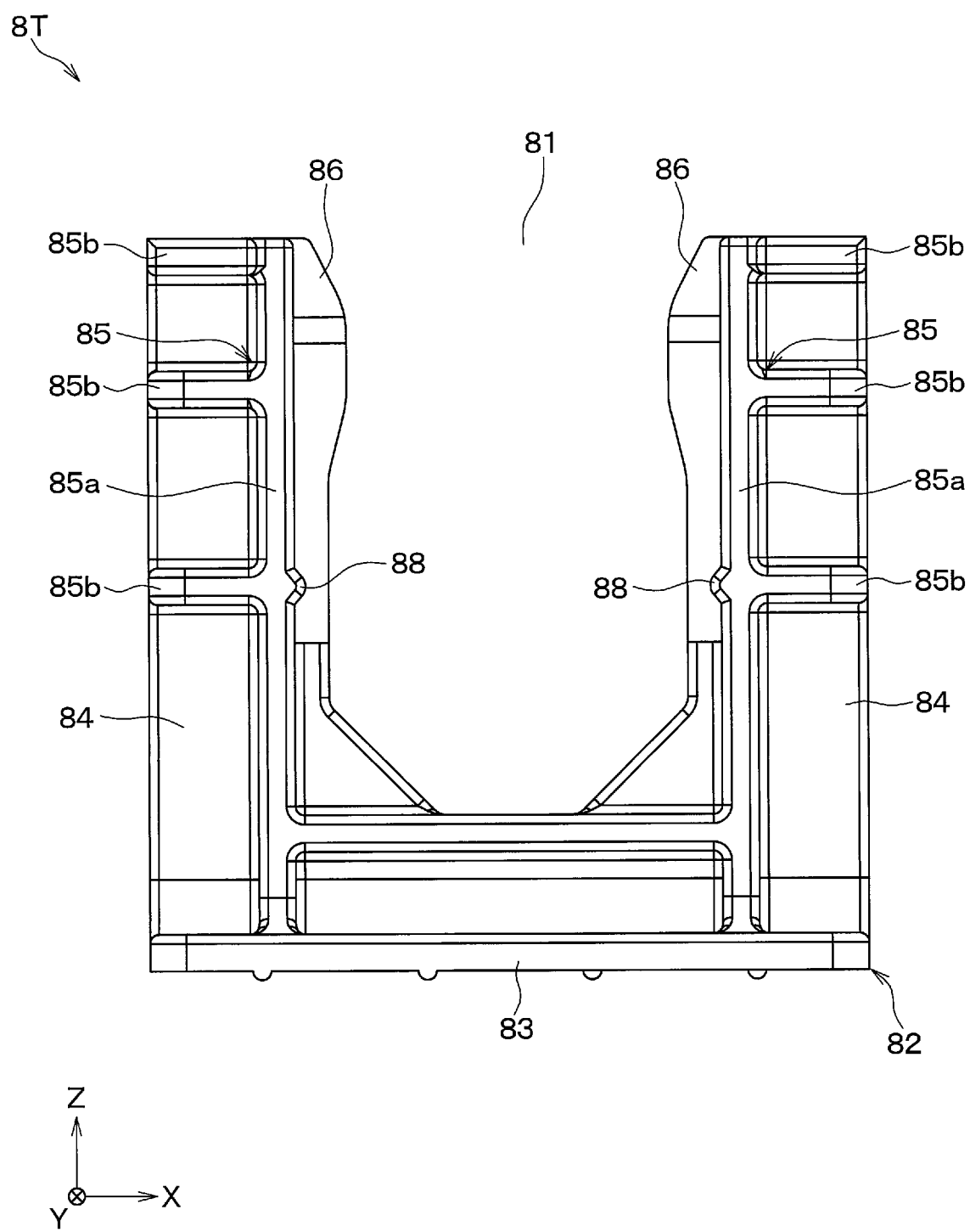
FIG. 12A is a back view of a center retainer shown in FIG. 2E.

Each of the corner retainer 8C and the center retainer 8T is, as illustrated in FIGS. 11A and 12A, of a substantially U-shape and has the opening 81 facing the positive Z-axis direction. Specifically, each of the corner retainer 8C and the center retainer 8T has the retainer body 82 that is a main body thereof. The retainer body 82 includes the connecting portion 83 extending in the X-axis direction and a pair of extensions 84 extending from ends of the connecting portion 83 in the positive Z-axis direction.

The connecting portion 83 is arranged to connect ends of the extensions 84 together. The extensions 84 extend in a direction crossing the center axis line CL and are arranged on opposite sides of the center axis line CL. The connecting portion 83 and the extensions 84 are arranged in the above layout to define the U-shape of the corner retainer 8C or the center retainer 8T.

The extensions 84 serve to hold the cylinder 72 of the bezel 7 disposed in an inner chamber which is defined between the extensions 82 and exposed outside the extensions 84 through the opening 81. Each of the corner retainer 8C and the center retainer 8T is also designed to have a direction in which the extensions 84 area arranged adjacent each other across the center axis line CL and which is perpendicular to a direction in which the small-diameter portion 59 are arranged adjacent each other across the center axis line CL.

Figure 11B:
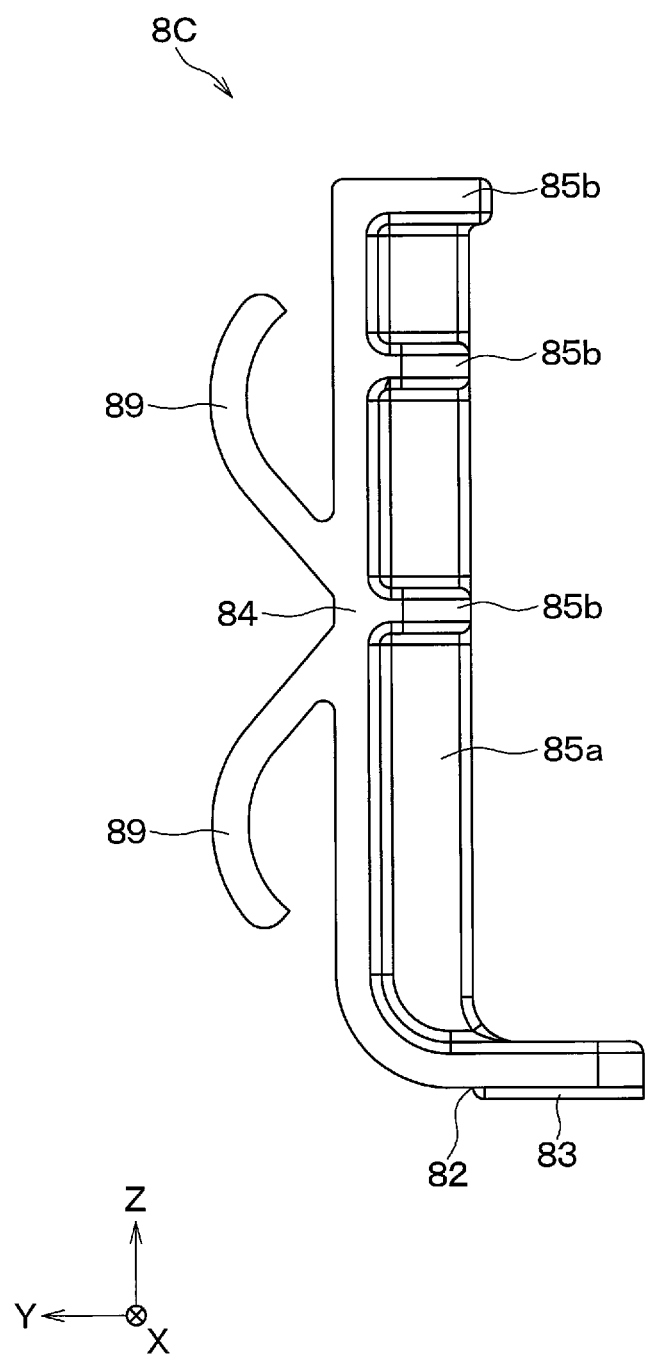
FIG. 11B is a right side view which illustrates the corner retainer shown in FIG. 11A.
Figure 12B:
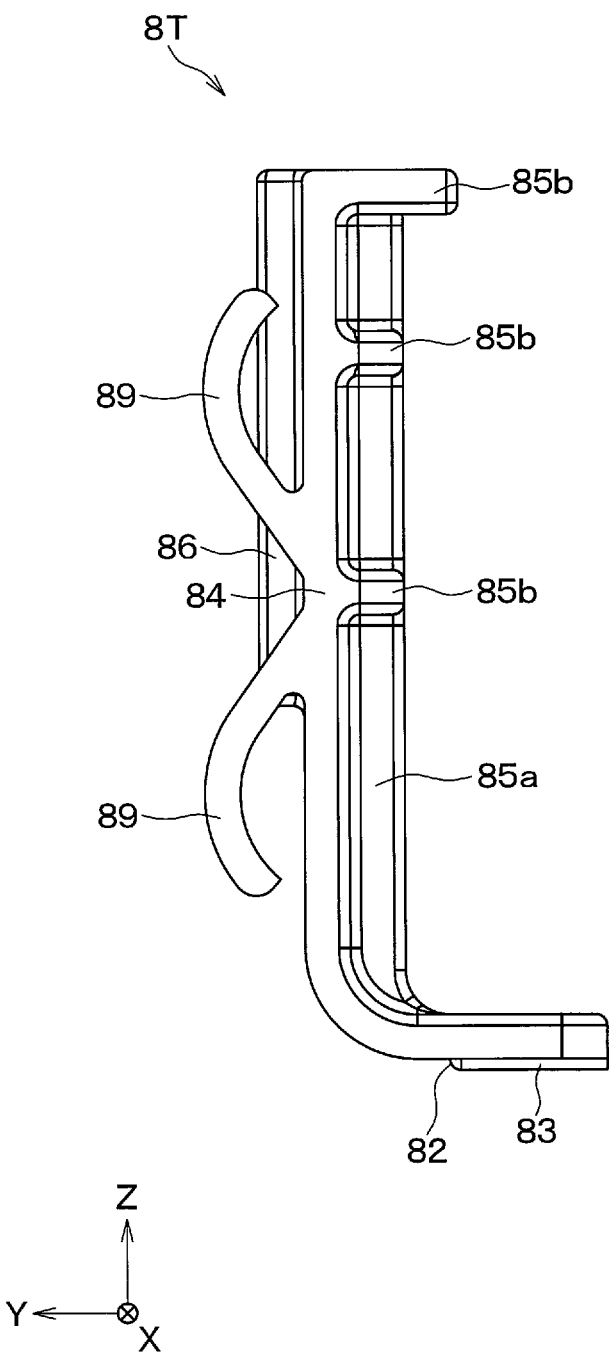
FIG. 12B is a right side view of the center retainer shown in FIG. 12A.

The retainer body 82 is, as clearly illustrated in FIGS. 11B and 12B, of a substantially J-shape in a side view defined by the connecting portion 83 and the extensions 84. The connecting portion 83 is of a plate-shape and has a thickness as defined in the Z-axis direction in the drawings. Each of the extensions 84 is also of a plate-shape and has a thickness as defined in the axial direction.

Each of the extensions 84 has a mechanical strength increased by the reinforcement 85 which protrudes in the axial direction in the form of a rib. Specifically, the reinforcement 85 includes the first rib 85a and the second ribs 85b. The first rib 85a is located at the center of the width of the extension 84, as defined in the X-axis direction, and extends along the length of the extension 84 in the Z-axis direction in the drawings. The second ribs 85b extend from the first rib 85a outward in the width direction of the extension 84.

Each of the extensions 84 also includes the bezel contact portion 86. The bezel contact portion 86 is, as can be seen in FIGS. 11A and 12A, located inside the first rib 85a in the width direction of the extension 84 and protrudes into the inner chamber exposed outside the extensions 84 through the opening 81.

Figure 11D:
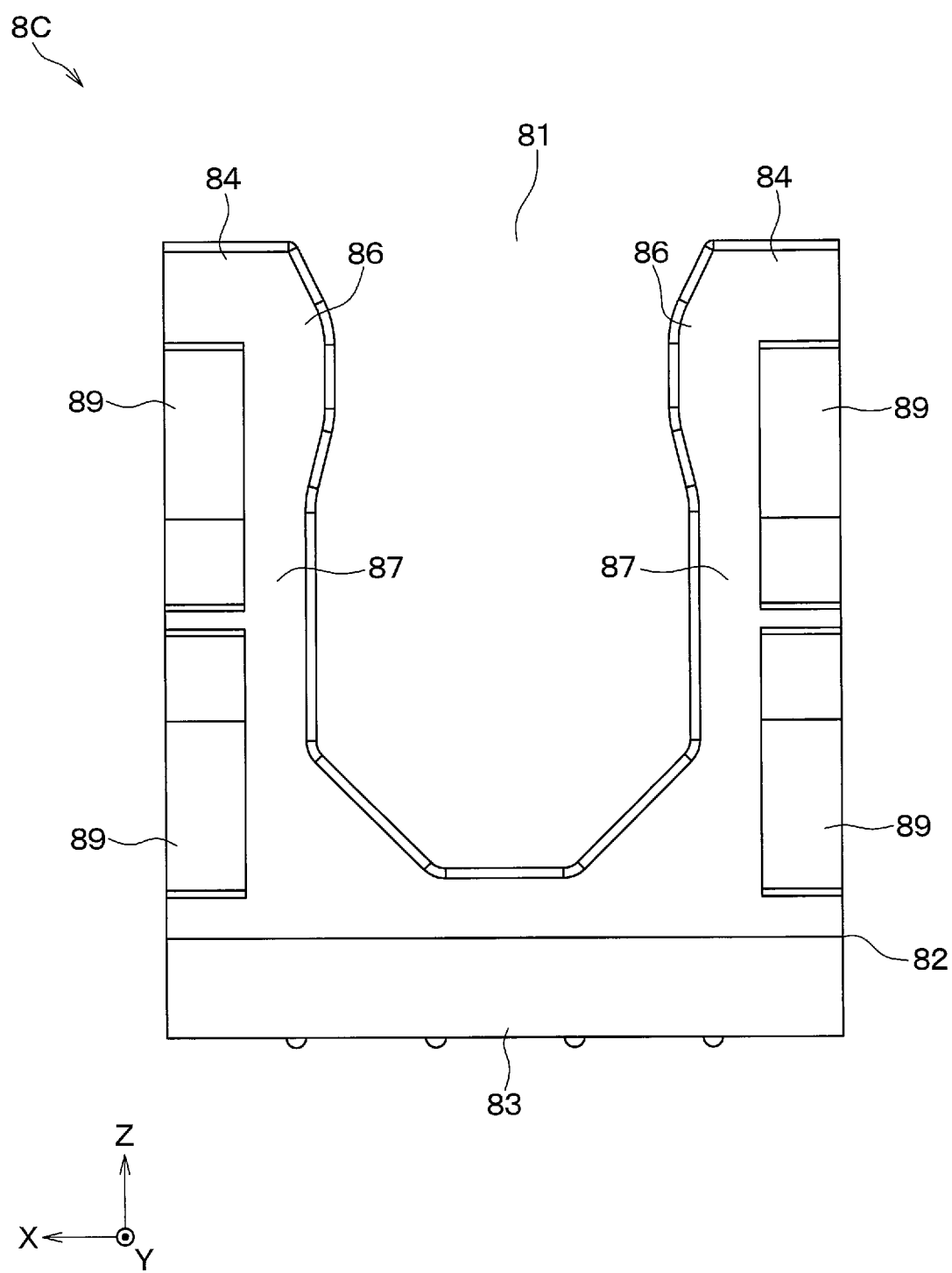
FIG. 11D is a front view of the corner retainer in FIG. 11A.
Figure 12C:
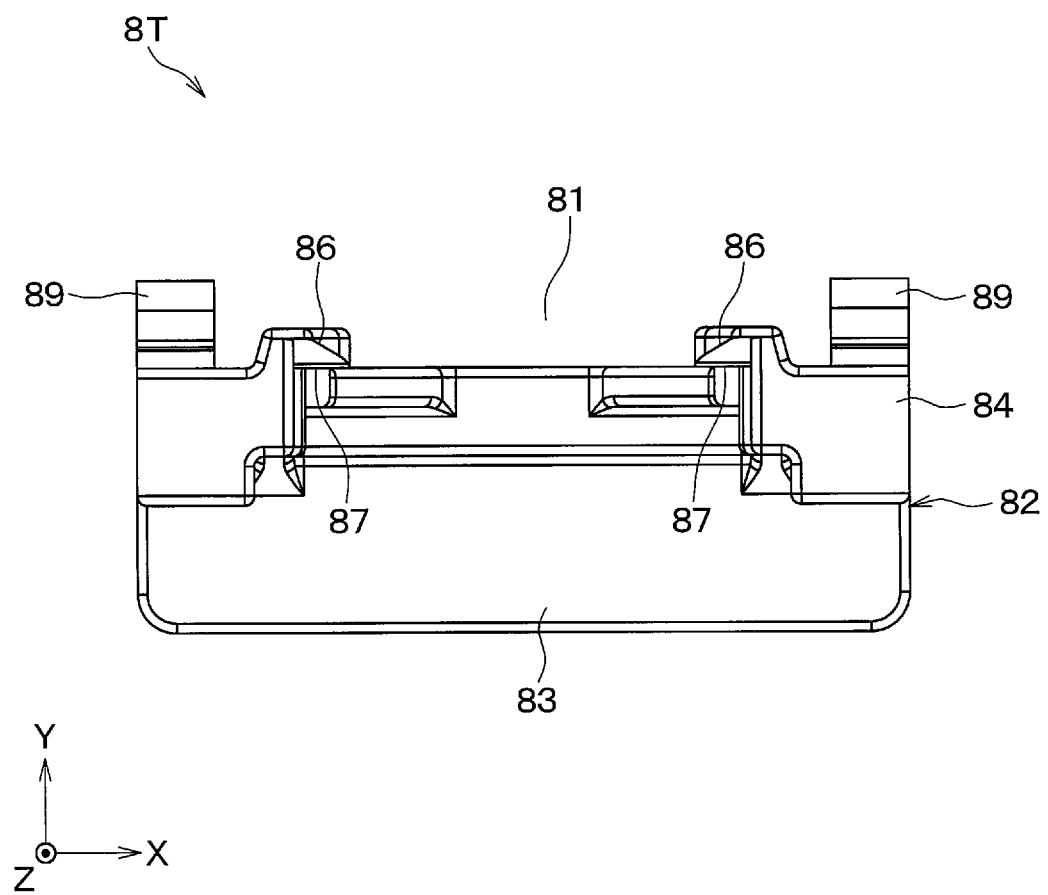
FIG. 12C is a plan view which illustrates the center retainer shown in FIG. 12A.
Figure 12D:
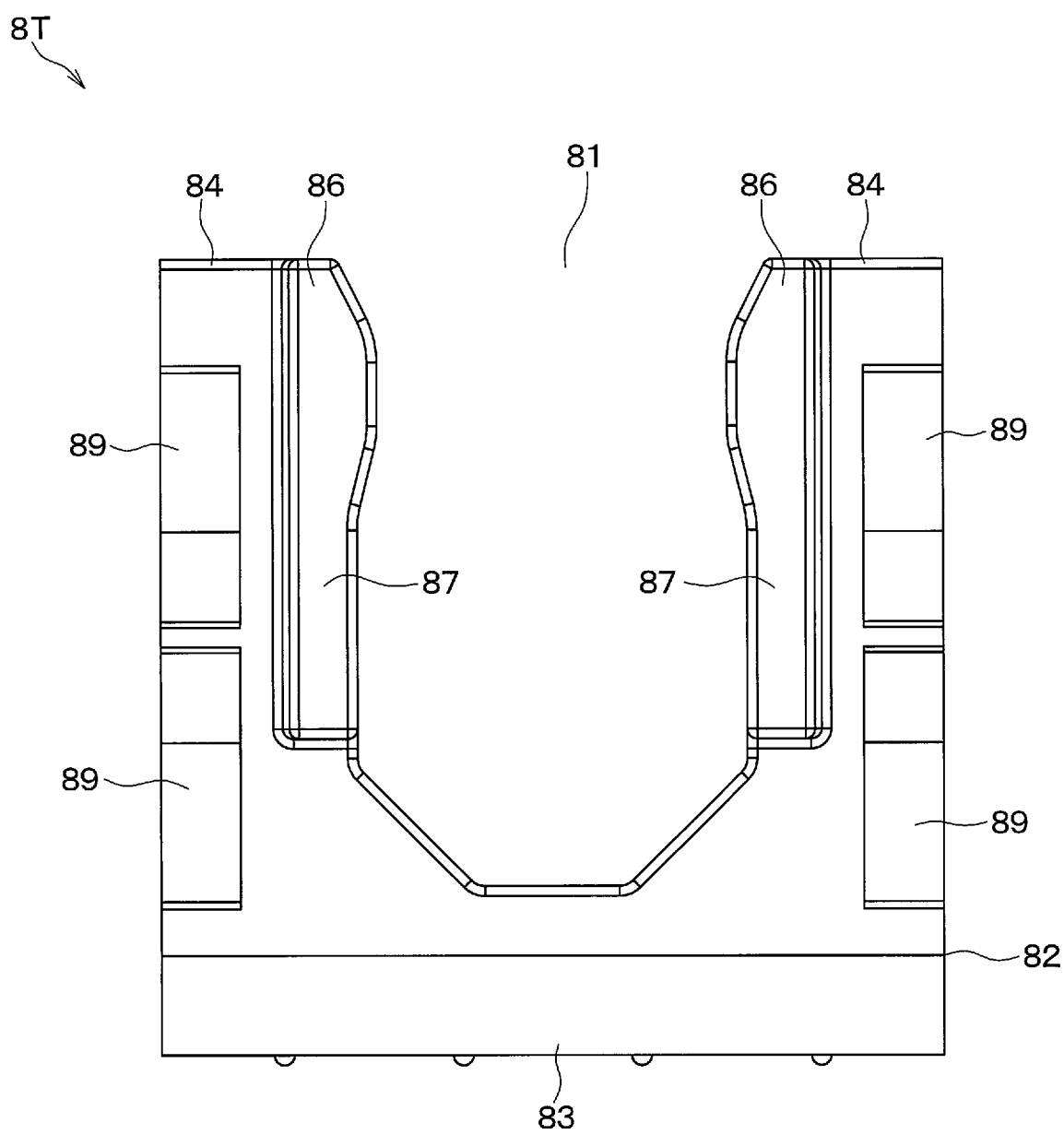
FIG. 12D is a front view of the center retainer in FIG. 12A.

The bezel contact portion 86 of each of the extensions 84, as illustrated in FIGS. 11C, 11D, and 12C, has the bezel contact surface 87 which makes a direct contact with the retainer contact surface 75a of the bezel 7 in the bumper-mounted state. The bezel contact surface 84 is shaped to be smooth or flat and have a normal line thereto which extends parallel to the center axis line CL in the bumper-mounted state.

Each of the extensions 84 is, as illustrated in FIGS. 11A and 12A, equipped with the bezel joint 88 which achieves detachable engagement with the retainer joint 79 illustrated in FIGS. 8D and 10C. Specifically, the bezel joint 88 is of a convex shape which fits a concave shape of the retainer joint 79. In other words, each of the bezel joints 88 bulges toward the inner chamber between the extensions 84 in which the bezel 7 is disposed.

Each of the corner retainer 8C and the center retainer 8T is, as illustrated in FIGS. 11B to 11D and 12B to 12D, equipped with a plurality of elastic portions 89. Each of the elastic portions 89 is made of a plate spring designed in the form of a cantilever and extends from the retainer body 82 in the positive Y-axis direction. The elastic portions 89 extend from a middle portion of a length of each of the extensions 84 to be oblique to the positive Y-axis direction. Specifically, each of the extensions 84 has the two elastic portions 89 arranged in a gull-wing shape. The elastic portions 89 are placed in abutment with the inner bumper surface V32 to be elastically deformable in the bumper-mounted state.

In order to eliminate the mounting errors, the interval between the retainer contact surface 75a and the reverse surface 71a of the flange 71 is, as described above, selected to differ, as can be seen in FIGS. 8A and 10A, between the corner bezel 7C and the center bezel 7T. An offset of each of the bezel contact surfaces 87, that is, a distance between each of the bezel contact surfaces 87 and a reference surface is, as can be seen in FIGS. 11C and 12C, selected to be different between the corner retainer 8C and the center retainer 8T. The reference surface, as referred to herein, is defined as an imaginary plane which is parallel to the X-Z plane in the drawings and approximately passes through locations of all the elastic portions 89 of each of the extensions 84 which are farthest away from a corresponding one of the extensions 84 placed in an unloaded condition.

In this embodiment, the center bezel 7T is shaped to have an interval between the retainer contact surface 75a and the reverse surface 71a of the flange 71 which is shorter than that in the corner bezel 7C, while the center retainer 8T is shaped to have a distance between the bezel contact surface 87 and the reference surface which is smaller than that in the corner retainer 8C.

Beneficial Advantages

How to attach each of the ultrasonic sensors 1 to the front bumper V3 and the bumper-mounted state will be described below along with beneficial advantages offered by the embodiment with reference to the drawings.

For the sake of simplicity, the following attachment method or attachment steps for the ultrasonic sensors 1 will be discussed using a right-handed Cartesian coordinate (X, Y, Z) system defined based on the illustrated vehicle-mounted state. The mounting or demounting of the ultrasonic sensors 1 in or from the front bumper V3 or the rear bumper V4 is, as described above, usually achieved after the front bumper V3 or the rear bumper V4 is removed from the vehicle body V1, so that the positive Z-axis direction may be different from the upward direction when the ultrasonic sensors 1 are actually attached to or removed from the front bumper V3 or the rear bumper V4.

First, the sensor bodies 2A illustrated in FIGS. 3A and 3B are produced. The anti-vibration spacers 6 illustrated in FIG. 6A are attached to the corner bezel 7C and the center bezel 7T.

Subsequently, the cushion 5 and the ultrasonic microphone 4 of the sensor body 2A are inserted at the axial base end of the cylinder 72 into the corner bezel 7C on which the anti-vibration spacer 6 is fit. Similarly, the cushion 5 and the ultrasonic microphone 4 of the sensor body 2A are inserted at the axial base end of the cylinder 72 into the center bezel 7T on which the anti-vibration spacer 6 is fit.

The corner bezel 7C is attached to the sensor body 2A in the above manner, thereby fabricating the secondary assembly illustrated in FIG. 7A. Similarly, the center bezel 7T is attached to the sensor body 2A in the above manner, thereby fabricating the secondary assembly illustrated in FIG. 7B. In each of the secondary assemblies, the cushion 5 is disposed in the cylinder 72 of the bezel 7 and surrounds the ultrasonic microphone 4.

The above attachment achieves engagement of the joint holes in the sensor joints 74 of the cylinder 72 with the bezel joint protrusions 37 of the microphone support 33. This causes the corner bezel 7C to be firmly secured to the sensor body 2A in the secondary assembly illustrated in FIG. 7A. Similarly, the center bezel 7T is firmly secured to the sensor body 2A in the secondary assembly illustrated in FIG. 7B.

The angular position or orientation of the corner bezel 7C or the center bezel 7T relative to the sensor body 2A around the center axis line CL is established by engagement of the angular positioning protrusion 38 with the angular positioning recess 78. This causes the bezel joint 77a of each of the secondary assemblies to be arranged at a required circumferential position. As apparent from the above discussion, the circumferential position of the bezel joint 77a is different between the secondary assembly for the corner sensor 1C illustrated in FIG. 7A and the secondary assembly for the center sensor 1T illustrated in FIG. 7B.

Specifically, the bezel joint 77a of the secondary assembly in FIG. 7A is located in alignment with a first bezel joint protrusion 37 which is one of two of the bezel joint protrusions 37 which are arranged closer to the connector 32 than the center axis line CL is. The first bezel joint protrusion 37 faces in the negative Z-axis direction. In contrast, the bezel joint 77a of the secondary assembly in FIG. 7B is, as described above, located in alignment with a second bezel joint protrusion 37 which is one of two of the bezel joint protrusions 37 which are arranged closer to the connector 32 than the center axis line CL is. The second bezel joint protrusion 37 faces in the positive Z-axis direction.

One of the secondary assemblies illustrated in FIG. 7A is inserted at the connector 32 into the first mounting hole V501 from the bumper-outside space SG. Another of the secondary assemblies illustrated in FIG. 7B is inserted at the connector 32 into the second mounting hole V502 from the bumper-outside space SG. Similarly, one of the secondary assemblies illustrated in FIG. 7B is inserted at the connector 32 into the third mounting hole V503 from the bumper-outside space SG. Another of the secondary assemblies illustrated in FIG. 7B is inserted at the connector 32 into each of the fourth mounting holes V504 from the bumper-outside space SG.

Upon insertion of the cylinder 72 of the bezel 7 into each of the mounting holes V5, the slant surface 76b of the temporary assembling protrusions 76a contacts the inner surface V51, thereby causing the free ends of the temporary assembling strips 76 to be elastically deformed toward the center axis line CL. When the temporary assembling protrusions 76a have passed through the mounting holes V5, it will cause the temporary assembling strips 76 to be elastically returned to their initial positions.

The bezel 6 is retained in the front bumper V3 by the flange 71 and the flange-facing surfaces 76c of the temporary assembling protrusions 76a, thereby placing the secondary assembly in the temporarily assembled state. The retainer 8 is also placed in a mountable/dismountable orientation wherein the opening 81 faces in the positive Z-axis direction, and the elastic portions 89 face the inner bumper surface V32 in the bumper-inside space SN.

The opening 81 of the corner retainer 8C placed in the mountable/dismountable orientation is brought close to the corner bezel 7C of the secondary assembly in the temporarily assembled state. The corner retainer 8C is then, as demonstrated in FIG. 1D, moved in the retainer attachment direction DS. Similarly, the opening 81 of the center retainer 8T placed in the mountable/dismountable orientation is brought close to the center bezel 7T of the secondary assembly in the temporarily assembled state. The center retainer 8T is then, as demonstrated in FIG. 1D, moved in the retainer attachment direction DS.

Specifically, the main body 73 of the cylinder 72 is held between the pair of extensions 84. The pair of extensions 84 are then thrust in the retainer fit grooves 75b in the retainer attachment direction DS. This causes the corner retainer 8C or the center retainer 8T to be moved in the retainer attachment direction DS until the cylinder 72 and the connecting portion 83 are brought closest to each other.

The bezel contact surface 87, therefore, contacts the retainer contact surface 75a. The retainer joints 79 of the cylinder 72 engage the bezel joints 88 of the extensions 84. This causes the retainer 8 to be firmly held by the protrusions 75 of the bezel 7 and the inner bumper surface V32 with the aid of elastic pressure produced by the elastic portions 89.

Each of the retainers 8 is fit in a corresponding one of the secondary assemblies in the temporarily assembled state in the above manner. This achieves attachment of the corner sensors 1C and the center sensors 1T illustrated in FIGS. 2A to 2E to the front bumper V3.

The vehicle-mounted orientations of the ultrasonic sensors 1 may be changed depending upon mounted locations of the ultrasonic sensors 1 which are different from each other in the width direction of the vehicle V. For instance, each of the corner sensors 1C is mounted in the front bumper V3, as demonstrated in FIG. 1C, to have the longitudinal connector direction DC located outward in the width direction of the vehicle V, i.e., away from the vehicle center plane PC, while each of the center sensors 1T is mounted in the front bumper V3 to have the longitudinal connector direction DC located inwardly in the width direction of the vehicle V, i.e., close to the vehicle center plane PC.

It is, therefore, required to eliminate the mounting error of each of the ultrasonic sensors 1 in order to have the longitudinal connector direction DC placed in a correct orientation. Referring to FIG. 1D, the corner sensor 1C which is to be disposed in the first mounting hole V501 is required to have the longitudinal connector direction DC oriented in the negative X-axis direction. If the longitudinal connector direction DC of the corner sensor 1C is oriented in the positive X-axis direction, it will result in the mounting error.

The ultrasonic sensors 1 may be designed to have configurations different depending upon locations where they need to be mounted in the vehicle V. For instance, as illustrated in FIGS. 2A and 2E, the angle which the directivity axis, i.e., the center axis line CL makes with the front bumper V3 in the vehicle-mounted state is different between the corner sensors 1C and the center sensors 1T, while the corner bezel 7C and the center bezel 7T are different in configuration thereof.

It is, therefore, required to avoid the mounting errors of the ultrasonic sensors 1 in order to have their directivity axes in selected orientations. Referring to FIG. 1D, for instance, the corner sensor 1C is required to be disposed in the first mounting hole V501. If the center sensor 1T is erroneously fit in the first mounting hole V501, it will result in the mounting error that its directivity axis is not oriented in a selected direction.

In order to alleviate the above drawback (i.e., the mounting error), the corner sensors 1C and the center sensors 1T are designed to be different in configuration from each other. If, however, the configurations of the corner sensors 1C and the center sensors 1T are designed to differ from each other to such an extent that requires the mounting holes V5 to differ in diameter or size from each other, it will result in an increase in total production cost of the corner sensors 1C and the center sensors 1T and the front bumper V3. Alternatively, if the bezel 7 and/or the flange 71 are designed to differ in outer appearance or surface color between the corner sensors 1C and the center sensors 1T, it will result in an increase in total production cost or adverse effects on the design of the vehicle V.

Each of the mounting holes V5 in this embodiment is designed to have the single bumper joint V52 arranged at a given position on the inner circumference thereof. The bezel 7 has the single bezel joint 77a which is arranged at a given position on the circumference thereof and configured to engage the bumper joint V52.

In this embodiment, the mounting holes V5 are identical in configuration with each other, but designed to have the bumper joints V52 whose angular locations around the center CP are different from each other in order to eliminate the risk of the mounting error. Specifically, the bumper joints V52 of the first mounting hole V501 and the second mounting hole V502 are located at 180° away from each other in the circumferential direction. Similarly, the bumper joints V52 of the third mounting hole V503 and the fourth mounting hole V504 are located at 180° away from each other in the circumferential direction.

The above configurations of the corner sensors 1C and the mounting holes V5 avoid errors in angular locations (which will also be referred to as errors in sensor mounting angles) of the corner sensors 1C mounted in the first mounting hole V501 and the second mounting hole V502 without having to increase production costs of the corner sensors 1C and the front bumper V3. Similarly, the above configurations of the center sensors 1T and the mounting holes V5 avoid errors in angular locations of the center sensors 1T mounted in the third mounting hole V503 and the fourth mounting hole V504 without having to increase production costs of the center sensors 1T and the front bumper V3.

The bumper joints V52 of the first mounting hole V501 and the third mounting hole V503 are located at 90° away from each other in the circumferential direction. Similarly, the bumper joints V52 of the second mounting hole V502 and the fourth mounting hole V504 are located at 90° away from each other in the circumferential direction. Further, the bezel joints 77a of the corner bezel 7C and the center bezel 7T are located at 90° away from each other in the circumferential direction.

Accordingly, if each of the center sensors 1T is fit in the first mounting hole V501 or the second mounting hole V502, the above layout of the bumper joints V52 will cause the longitudinal connector direction DC of each of the center sensors 1T to be oriented in the Z-axis direction. Similarly, if each of the corner sensors 1C is fit in the third mounting hole V503 or the fourth mounting hole V504, the above layout of the bumper joints V52 will cause the longitudinal connector direction DC of each of the corner sensors 1C to be oriented in the Z-axis direction. This enables the mounting errors of the corner sensors 1C and the center sensors 1T to be eliminated without having to increase the production costs thereof.

Each of the bumper joint V52 in this embodiment is rounded in shape thereof. This enables the mounting holes V5 suitable for eliminating the risk of the mounting error to be formed in the front bumper V3 made of a metallic plate without having to increase the production cost of the front bumper V3.

Each of the bumper joints V52 is designed as the bumper protrusion V53 which bulges inwardly in the mounting hole V5. Such configurations of the bumper joints V52, therefore, result in no increase in diameter of the mounting holes V5, so that the flanges 71 fully cover or close the mounting holes V5, thereby eliminating the need to increase the outer diameters of the flanges 71, which will usually result in an increase in size of the bezels 7.

The circumferential locations of the bumper joints V52 (i.e., the bumper protrusions V53) may be, as described already with reference to FIG. 1D, expressed by angles of direction based on the reference angle of direction from the center CP in the positive Z-axis direction. If the angle of direction of each of the bumper joints V52 is a multiple of 90° indicated by a chain line, it may result in physical interference of the bumper protrusion V53 with a portion of the secondary assembly when the secondary assembly is inserted at the connector 32 from the bumper-outside space SG into the mounting hole V5.

For instance, if the angle of direction of the bumper joint V52 is 0° or 180°, it will cause the bumper protrusion V53 to interfere with ends of the width of the box 31 of the sensor case 3. Alternatively, if the angle of direction of the bumper joint V52 is 90° or 270°, it will cause the bumper protrusion V53 to interfere with the retainer joints 79 of the protrusions 75 of the bezel 7.

The angles of direction of the bumper joints V52, i.e., the bumper protrusions V53 in this embodiment are selected not to be a multiple of 90°, thereby avoiding the physical interference of the bumper protrusions V53 with the secondary assemblies.

Each of the mounting holes V5 in this embodiment is designed to have the single bumper joint V52. The bumper joints V52 of the mounting holes V5 are oriented at 45°, 135°, 225°, and 315° angles of direction from the center CP, respectively, thereby minimizing the mounting errors of the ultrasonic sensors 1 at a minimum cost of machining the front bumper V3.

We have studied the following comparative structures of the front bumper V3 and the corner sensors 1C. Specifically, each of the mounting holes V5 in the front bumper V3 have two bumper joint V52 which are located at 90° away from each other. Referring to FIG. 1D, for instance, the first mounting hole V501 is designed to have the bumper joints V53 arranged at 225° and 315° angle of direction from the center CP. The second mounting hole V502 is designed to have bumper joints V53 arranged at 45° and 135° angle of direction from the center CP. The corner bezel 7C is also designed to have two bezel joints 77a.

Each of the third mounting hole V503 and the fourth mounting hole V504 is, like in this embodiment, designed to have the single bumper joint V52, i.e., the bumper protrusion V53. The center bezel 7T is also designed to have the single bezel joint 77a.

The above comparative structures enable the mounting error (i.e., an error in sensor mounting angle) caused when the corner sensors 1C are fit in the first mounting hole V501 and the second mounting hole V502 to be eliminated, like in the above embodiment. Similarly, the above comparative structures also enable the mounting error caused when the center sensors 1T are fit in the third mounting hole V503 and the fourth mounting hole V504 to be eliminated.

It is impossible to install the center sensors 1T each including the center bezel 7T equipped with the single bezel joint 77a in the first mounting hole V501 and the second mounting hole V502 each of which is equipped with the two bumper protrusions V53. It is, however, possible to install the corner sensors 1C each including the corner bezel 7C equipped with the two bezel joints 77a in the third mounting hole V503 and the fourth mounting hole V504 each of which is equipped with the single bumper protrusion V53. It is, therefore, impossible for the above comparative structures to fully eliminate the mounting errors of the corner sensors 1C and the center sensors 1T.

The above embodiment is, as described above, designed to have the corner bezel 7C and the center bezel 7T which are different in interval between the retainer contact surface 75a and the reverse surface 71a of the flange 71 from each other. Additionally, the offset of each of the bezel contact surfaces 87, that is, a distance between each of the bezel contact surfaces 87 and the reference surface is, as described above, selected to be different between the corner retainer 8C and the center retainer 8T. This avoids the mounting errors caused by use of a combination of the corner bezel 7C and the center retainer 8T or a combination of the center bezel 7T and the corner retainer 8C without having to increase the total production cost.

The structures of the corner bezel 7C and the center bezel 7T in this embodiment serve to minimize the need for designing the configurations of the flanges 71 thereof to differ from each other apart from a difference in configuration of the flanges 71 depending upon a difference in inclination of the flanges 71 to the center axis line CL between the corner bezel 7C and the center bezel 7T. In other words, a difference in outer shape of the flanges 71 is minimized between the corner bezel 7C and the center bezel 7T. This avoids an increase in total production cost or adverse effects on the design of the vehicle V.

In this embodiment, each of the corner bezel 7C and the center bezel 7T is designed to have the two protrusions 75 for use in orienting the retainer attachment direction DS in a selected direction. This facilitates attachment of the corner sensors 1C and the center sensors 1T to the vehicle V.

The corner sensors 1C and the center sensors 1T in this embodiment use the common design of the sensor body 2A. In other words, each of the corner sensors 1C is made of a combination of the corner bezel 7C and the sensor body 2A which is common in structure to the center sensors 1T, while each of the center sensors 1T is made of a combination of the center bezel 7T and the sensor body 2A which is common in structure to the corner sensors 1C. This enables the directivities of the ultrasonic sensors 1 to be altered as needed with a minimum change in configuration of parts of the ultrasonic sensors 1.

Modifications

This disclosure is not limited to the above embodiments. The above embodiment may, therefore, be modified in various ways. The following discussion will refer major modifications. The same parts as those in the above embodiments or equivalents thereof will be referred to using the same reference numbers or symbols as those in the above embodiments. In the following discussion, the same explanation as in the above embodiments, therefore, holds true for the parts in the following modifications indicated by the same reference numbers or symbols as those in the above embodiments unless otherwise specified.

The vehicle-mounted assembly S may be designed to have the third orientation which is identical in vehicle-mounted angle with the first orientation and also to have the fourth orientation which is identical in the vehicle-mounted angle with the second orientation. For instance, referring to FIG. 1D, the angles θ1 and θ2 may be shifted 180° around the center CP. Alternatively, the angles θ3 and θ4 may be shifted 180° around the center CP.

The above angular relation causes the mounted angle (i.e., angular orientation) of the corner sensor 1C fit in the first mounting hole V501 to be identical with that of the center sensor 1T fit in the third mounting hole V503 or alternatively causes the mounted angle of the corner sensor 1C fit in the second mounting hole V502 to be identical with that of the center sensor 1T fit in the fourth mounting hole V504. This orients the longitudinal connector directions DC of all the corner sensors 1C and the center sensors 1T mounted in the front bumper V3 inwardly in the width direction of the vehicle V, i.e., toward the vehicle center plane PC or alternatively outwardly in the width direction of the vehicle V, i.e., away from the vehicle center plane PC.

As long as the first mounting hole V501 and the second mounting hole V502 are identical in diameters with each other, and the third mounting hole V503 and the fourth mounting hole V504 are identical in diameter with each other, the first mounting hole V501 and the third mounting hole V503 may be different in diameter from each other.

For the sake of simplicity of disclosure, the above discussion has referred only to the ultrasonic sensors 1 mounted in the front bumper V3, but however, this disclosure is not limited to such a mode. The above embodiments may be used with the ultrasonic sensors 1 mounted in the rear bumper V4.

The ultrasonic sensors 1 may be attached to an object other than the front bumper V3 or the rear bumper V4. For instance, the ultrasonic sensors 1 may be mounted in the body panel V2. In this case, the mounting holes V5 are formed in the body panel V2.

The ultrasonic sensors 1 are not limited to sensors which emit or receive ultrasound. For instance, the ultrasonic sensors 1 may be designed only to emit ultrasound or alternatively only to receive returns of ultrasound, as emitted from another ultrasonic sensor, from an object(s) existing around the other ultrasonic sensor.

The parts of the ultrasonic sensors 1 may have structures different from those in the above embodiments or be made from materials different from those in the above embodiments. Two or more parts of the ultrasonic sensors 1 which are made from the same material in the above embodiments may also be made from materials different in kind from each other. Alternatively, two or more parts of the ultrasonic sensors 1 which are made from materials different from each other in the above embodiments may be made from the same material.

Two or more parts of the ultrasonic sensors 1 which are made of a seamless one-piece member in the above embodiments may be made of two or more discrete members adhered to joined to each other. Alternatively, two or more parts of the ultrasonic sensors 1 which are made of discrete members adhered or joined together in the above embodiments may be made of a seamless one-piece member.

The sensor case 3 may also be designed to have a structure different from that in the above embodiments. For instance, the mechanical structure or orientation of the connector 32 may be modified. The microphone support 33 may alternatively be made in the form of an oval cylindrical, elongated cylindrical, or polygonal cylindrical shape.

The corner sensors 1C and the center sensors 1T may be designed to be different in structure of the sensor case 3. The angle which the longitudinal connector direction DC of each of the corner sensors 1C makes with the X-axis in the drawings may be selected to be identical with or different from that which the longitudinal connector direction DC of each of the center sensors 1T makes with the X-axis.

Specifically, in the above embodiment, the corner sensors 1C and the center sensors 1T are identical in structure of the sensor case 3 with each other. In other words, the sensor case 3 of the corner sensors 1C and the sensor case 3 of the center sensors 1T are identical in angle which the longitudinal connector direction DC makes with the center axis line CL with each other. This causes the angle which the longitudinal connector direction DC of the center sensors 1T makes with the X-axis to be larger than that which the longitudinal connector direction DC of the corner sensors 1C makes with the X-axis by an angle at which the center axis line CL of the center sensors 1T is inclined to the normal line to the X-Z plane in the drawings.

As an alternative to the above structure, the sensor case 3 of the corner sensors 1C and the sensor case 3 of the center sensors 1T may be different in angle which the longitudinal connector direction DC makes with the center axis line CL with each other. This causes the angle which the longitudinal connector direction DC of the corner sensors 1C makes with the X-axis to be identical with that which the longitudinal connector direction DC of the center sensors 1T makes with the X-axis. In other words, the sensor case 3 of the corner sensors 1C and the sensor case 3 of the center sensors 1T become identical with each other in an angle which an imaginary plane defined to extend parallel to the reverse surface 71a of the flange 71 makes with the longitudinal connector direction DC.

The outer shape of the ultrasonic microphone 4 or the microphone case 42 needs not to be cylindrical, but may be oval cylindrical or polygonal cylindrical. The ultrasonic device 41 may alternatively be made of an electrical energy-to-mechanical energy transducer other than a piezoelectric device.

The cushion 5 may also be designed to have a structure different from that in the above embodiment. For instance, the cushion 5 may alternatively be made in the form of an oval cylindrical, elongated cylindrical, or polygonal cylindrical shape.

The cushion 5 may be, like the bezel 7, attached to the sensor body 2A (i.e., the primary assembly) from behind it to make the secondary assembly. In such a case, the ultrasonic microphone 4 is retained directly by the microphone support 33 of the sensor case 3 without use of the cushion 5. The cushion 5 is shaped to be cylindrical and has an axial dimension substantially identical with that of the ultrasonic microphone 4, i.e., the microphone case 42.

The bezel 7 or the retainer 8 which is an attachment member for use in attaching each of the ultrasonic sensors 1 to a plate-like vehicle body member (e.g., the front bumper V3) may also be designed to have a structure different from those in the above embodiment. For instance, the bezel 7 and/or the retainer 8 may be made of several parts different from those in the above embodiments.

The first mounting hole V501 and the third mounting hole V503 may be, as described above, shaped to have diameters different from each other. In such a case, the corner bezel 7C and the center bezel 7T are designed to have outer diameters different from each other.

The concave-convex structures of the bezel joint 77a and the bumper joint V52 may be inverse of each other. Specifically, the bezel joint 77a may have protrusions extending in the radial direction outside the remaining portion of the front end protrusion 77, while the bumper joint V52 may have recesses whose depths are defined by increased inner diameters of corresponding portions of the mounting hole V5.

The bumper joint V52 of each of the mounting holes V5 is as described above, made by a combination of a recess(es) and a raised portion(s) which are formed in and on the inner wall of the mounting hole V5. Two recesses may be formed in the inner wall of the mounting hole V5 to result in partial increases in inner diameter of the mounting hole V5. In other words, the formation of the recesses results in formation of the raised portion between the recesses on the inner wall of the mounting hole V5. The bumper joint V52 may alternatively be made of a combination of a recess and raised portions in and on the inner wall of the mounting hole V5.

The raised portions may be shaped to result in formation of the recess in the inner wall of the mounting hole V5 between the raised portions. Each of the bezel joints 77a may be made in the same way as the bumper joints V52. Unless otherwise specified by the applicant during examination proceedings, it should be noted that the concave or convex structures of the bumper joints V52 or the bezel joints 77a do not adversely affect a decision of infringement of the patent.

The component parts described in the above embodiments are not necessarily essential unless otherwise specified or viewed to be essential in principle. When the number of the component parts, a numerical number, a volume, or a range is referred to in the above discussion, this disclosure is not limited to it unless otherwise specified or viewed to be essential in principle. Similarly, when the shape of, the orientation of, or the positional relation among the component parts is referred to in the above discussion, this disclosure is not limited to it unless otherwise specified or viewed to be essential in principle.

The modifications are also not limited to the above-described examples. A portion or whole of the embodiment may be combined with one or some of the modifications.

What is claimed is:

1. A vehicle-mounted assembly in which a vehicle-mounted device is attached to a plate-like vehicle body member with a through hole, wherein
   the vehicle-mounted device includes a cylindrical main body extending along a center axis line, protrusions protruding from the main body in a direction crossing the center axis line, a cylindrical member disposed in the through-hole, and a fastener which is held between the protrusions and the vehicle body member to secure the cylindrical member to the vehicle body member, and
   the through-hole is equipped with a vehicle body joint which engages a device joint made of recessed and raised portions of the cylindrical member, the vehicle body joint being arranged at a given location on an inner circumference of the through-hole around a center of the through-hole, wherein
   the vehicle body joint is configured to establish engagement with the device joint to fix a vehicle-mounted angle that is an angular position of the vehicle-mounted device around the center axis line,
   when the given location of the vehicle body joint lies at a first angular position, a vehicle-mounted orientation that is an orientation of the vehicle-mounted device relative to the vehicle body member is set to a first orientation, and when the given location lies at a second angular position diametrically opposed to the first angular position across the center of the through-hole, the vehicle-mounted orientation is set to a second orientation different from the first orientation, and
   the first orientation and the second orientation are symmetrically opposed to each other across a vehicle center plane that is an imaginary plane which is defined to extend perpendicular to a width direction of a vehicle to which the vehicle body member is attached and passes through a center of a width of the vehicle.

2. The vehicle-mounted assembly as set forth in claim 1, wherein the second orientation is different in the vehicle-mounted angle from the first orientation by 180°.

3. The vehicle-mounted assembly as set forth in claim 1, wherein when the given location of the vehicle body joint lies at a third angular position different from the first angular position and the second angular position, the vehicle-mounted orientation is set to a third orientation, and when the given location lies at a fourth angular position which is different from the first angular position and the second angular position and diametrically opposed to the third angular position across the center, the vehicle-mounted orientation is set to a fourth orientation different from the third orientation, and wherein the third orientation and the fourth orientation are symmetrically opposed to each other across the vehicle center plane.

4. The vehicle-mounted assembly as set forth in claim 3, wherein the third orientation and the fourth orientation are different from each other by 180°.

5. The vehicle-mounted assembly as set forth in claim 4, wherein the third orientation is identical in the vehicle-mounted angle with one of the first orientation and the second orientation.

6. The vehicle-mounted assembly as set forth in claim 3, wherein the through-hole in the vehicle body member includes a first through-hole, a second through-hole, a third through-hole, and a fourth through-hole which are circular and shaped to have vehicle body joints each of which is designed in a concave-convex shape on an inner surface of a corresponding one of the first to fourth through-holes and achieves engagement with the device joint, and wherein the first through-hole has the vehicle body joint located at the first angular position, the second through-hole has the vehicle body joint at the second angular position, the third through-hole has the vehicle body joint located at the third angular position, and the fourth through-hole has the vehicle body joint at the fourth angular position.

7. The vehicle-mounted assembly as set forth in claim 6, wherein the first through-hole, the second through-hole, the third through-hole, and the fourth through-hole are identical in diameter with each other.

8. The vehicle-mounted assembly as set forth in claim 6, wherein the first through-hole and the second through-hole are symmetrically opposed to each other across the vehicle center plane, the third through-hole and the fourth through-hole are symmetrically opposed to each other across the vehicle center plane, and the third through-hole and the fourth through-hole are arranged between the first through-hole and the second through-hole.

9. The vehicle-mounted assembly as set forth in claim 6, wherein the vehicle-mounted device includes first vehicle-mounted devices and second vehicle-mounted devices, a first one of the first vehicle-mounted devices including a first cylindrical member as the cylindrical member and having the device joint which engages the vehicle body joint formed in the first through-hole to achieve the first orientation of the first one, a second one of the first vehicle-mounted devices including a first cylindrical member as the cylindrical member and having the device joint which engages the vehicle body joint formed in the second through-hole to achieve the second orientation of the second one, and wherein a first one of the second vehicle-mounted devices includes a second cylindrical member as the cylindrical member and has the device joint which engages the vehicle body joint formed in the third through-hole to achieve the third orientation of the first one of the second vehicle-mounted devices, a second one of the second vehicle-mounted devices including a second cylindrical member as the cylindrical member and having the device joint which engages the vehicle body joint formed in the fourth through-hole to achieve the fourth orientation of the second one of the second vehicle-mounted devices.

10. The vehicle-mounted assembly as set forth in claim 9, wherein each of the first cylindrical members is oriented to have an angle at which the center axis line crosses the vehicle body member and which is different from those of the second cylindrical members.

11. The vehicle-mounted assembly as set forth in claim 1, wherein the protrusions are shaped to define a direction in which the fastener is mounted on or dismounted from the cylindrical member.

12. The vehicle-mounted assembly as set forth in claim 1, wherein the vehicle body member is made of a metallic plate, and wherein the vehicle body joint includes a protrusion which bulges inwardly in the through-hole and is rounded.

13. The vehicle-mounted assembly as set forth in claim 1, wherein the vehicle-mounted device is implemented by an ultrasonic sensor designed to have directivities which are different between horizontal and vertical directions.

* * * * *